United States Patent
Chakrabarti et al.

(10) Patent No.: US 9,819,769 B2
(45) Date of Patent: Nov. 14, 2017

(54) ACTIVE ANTENNA ELEMENT (AAE) IMPLEMENTATION FOR FACILITATING 6LOWPAN DATA ACCESS

(71) Applicant: TELEFONAKTIEBOLAGET LM ERICSSON (PUBL), Stockholm (SE)

(72) Inventors: Samita Chakrabarti, Sunnyvale, CA (US); John Larkins, San Ramon, CA (US); Jaume Rius I Riu, Järfälla (SE); John Fornehed, Sollentuna (SE); Chenguang Lu, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/134,237

(22) Filed: Apr. 20, 2016

(65) Prior Publication Data
US 2016/0234350 A1    Aug. 11, 2016

Related U.S. Application Data

(63) Continuation of application No. 14/187,167, filed on Feb. 21, 2014, now abandoned.

(51) Int. Cl.
*H04L 29/06* (2006.01)
*H04L 29/12* (2006.01)
(Continued)

(52) U.S. Cl.
CPC .......... *H04L 69/08* (2013.01); *H04L 61/6059* (2013.01); *H04L 69/16* (2013.01);
(Continued)

(58) Field of Classification Search
CPC ..... H04L 69/08; H04L 61/6059; H04L 69/16; H04W 84/12; H04W 80/04; H04W 84/045; H04W 88/10; H04W 84/22
See application file for complete search history.

(56) References Cited

U.S. PATENT DOCUMENTS 8,284,061 B1 * 10/2012 Dione ................ G06Q 30/0269
235/383
8,706,135 B2    4/2014 Ibrahim
(Continued)

FOREIGN PATENT DOCUMENTS

WO    WO 2012/059821 A1    5/2012

OTHER PUBLICATIONS

IEEE Std 802.15.4™-2006, IEEE Standard for Information technology—Telecommunications and information exchange between systems—Local and metropolitan area networks—Specific requirements. Part 15.4: Wireless Medium Access Control (MAC) and Physical Layer (PHY) Specifications for Low-Rate Wireless Personal Area Networks (WPANs); Sep. 8, 2006, the whole document.

(Continued)

*Primary Examiner* — Mohammad Anwar
(74) *Attorney, Agent, or Firm* — Patent Portfolio Builders, PLLC

(57) ABSTRACT

A scheme for providing access to 6LoWPAN data in a wireless access network comprising a Digital Unit (DU) coupled to one or more Radio Units (RU) via CPRI links, each RU in turn coupled to one or more radio dot (RD) elements via Ethernet cable links. In one embodiment, an RD element includes a cable front-end interfaced with the Ethernet cable link, a radio front-end interfaced between the cable front-end and an antenna or a suitable access point. A sensor component may be included that is configured to generate sensor data with respect to a measurement variable, which sensor data may be packaged in a 6LoWPAN data format for transmission to the RU element coupled to the RD element.

30 Claims, 11 Drawing Sheets

(51) Int. Cl.
H04W 80/04 (2009.01)
H04W 84/12 (2009.01)
H04W 84/04 (2009.01)
H04W 84/22 (2009.01)
H04W 88/10 (2009.01)
H04W 88/16 (2009.01)

(52) U.S. Cl.
CPC ......... *H04W 80/04* (2013.01); *H04W 84/045* (2013.01); *H04W 84/12* (2013.01); *H04W 84/22* (2013.01); *H04W 88/10* (2013.01); *H04W 88/16* (2013.01)

(56) References Cited

U.S. PATENT DOCUMENTS

| | | | |
|---|---|---|---|
| 9,019,892 B2 | 4/2015 | Zhang et al. | |
| 2002/0051430 A1* | 5/2002 | Kasami | H04W 16/28 370/319 |
| 2006/0055552 A1* | 3/2006 | Chung | B60R 25/00 340/686.1 |
| 2006/0198336 A1* | 9/2006 | Major | H04W 88/06 370/328 |
| 2013/0188491 A1* | 7/2013 | Ludwig | H04L 47/32 370/235 |
| 2013/0215810 A1 | 8/2013 | Wang et al. | |
| 2013/0282196 A1 | 10/2013 | Tappeiner | |
| 2013/0311140 A1 | 11/2013 | Schechter | |
| 2014/0089143 A1 | 3/2014 | Dione | |
| 2014/0177613 A1 | 6/2014 | Baker et al. | |
| 2015/0071139 A1 | 3/2015 | Nix | |
| 2015/0074228 A1 | 3/2015 | Drake | |
| 2015/0366039 A1 | 12/2015 | Noori et al. | |

OTHER PUBLICATIONS

Bag G. et al., "LoWMob: Intra-PAN Mobility Support Schemes for 6LoWPAN", *Sensors* 2009, 9, 5844-5877; doi:10.3390/s90705844, Jul. 22, 2009 (Jul. 22, 2009), abstract, paragraph [0001], figure 1 paragraph [0003], figures 10-13.

Shelby Z et al.: "Neighbor Discovery Optimization for IPv6 over Low-Power Wireless Personal Area Networks (6LoWPANs)", RFC6775.TXT, Internet Engineering Task Force, IETF; Standard, Internet Society (ISOC) 4, Rue des Falaises CH—1205 Geneva, Switzerland, Nov. 6, 2012 (Nov. 6, 2012), pp. 1-55, XP015086471, figure 4, points 2, 3.5, 4, 4.1, 4.4, 6, 6.5.3, 7, 8.2.

Bjelica, M. Z. et al. "Gateway Device for Energy-Saving Cloud-Enabled Smart Homes," MIPRO, XP032202032, May 21-25, 2012, pp. 865-868.

Paventhan, A. et al. "WSN monitoring for agriculture: comparing SNMP and emerging CoAP approaches," Texas Instruments India Educators' Conference, XP032575626, Apr. 4, 2013, pp. 353-358.

* cited by examiner

ACTIVE ANTENNA ELEMENT (AAE) IMPLEMENTATION FOR FACILITATING 6LOWPAN DATA ACCESS

PRIORITY AND CROSS-REFERENCE TO RELATED APPLICATIONS

This application is a Continuation of the following co-pending commonly assigned patent application: (i) "ACTIVE ANTENNA ELEMENT (AAE) IMPLEMENTATION FOR FACILITATING 6LOWPAN DATA ACCESS" (Ericsson Ref. No.: P42567-US1), application Ser. No. 14/187,167, filed Feb. 21, 2014, in the name(s) of Samita Chakrabarti, John Larkins, Jaume Rius Riu, John Fornehed and Chenguang Lu, and discloses subject matter that is related to the subject matter of the following U.S. patent application(s): (i) "SYSTEMS, METHODS, APPARATUSES, DEVICES AND ASSOCIATED COMPUTER-READABLE MEDIA FOR PROVIDING 6LOWPAN DATA ACCESS" (Ericsson Ref. No.: P42124-US1), application Ser. No. 14/187,148, filed Feb. 21, 2014, in the name(s) of Samita Chakrabarti, John Larkins, Jaume Rius Riu, John Fornehed and Chenguang Lu; (ii) "BASEBAND UNIT (BBU) IMPLEMENTATION FOR FACILITATING 6LOWPAN DATA ACCESS" (Ericsson Ref. No.: P42566-US1), application Ser. No. 14/187,158, filed Feb. 21, 2014, in the name(s) of Samita Chakrabarti, John Larkins, Jaume Rius Riu, John Fornehed and Chenguang Lu; and (iii) "PICO-RRU-BASED NETWORK IMPLEMENTATION FOR FACILITATING 6LOWPAN DATA ACCESS" (Ericsson Ref. No.: P42568-US1), application Ser. No. 14/187,174, filed Feb. 21, 2014, in the name(s) of Samita Chakrabarti, John Larkins, Jaume Rius Riu, John Fornehed and Chenguang Lu; each of which is hereby incorporated by reference in its entirety.

FIELD OF THE DISCLOSURE

The present disclosure generally relates to communication networks. More particularly, and not by way of any limitation, the present disclosure is directed to providing or otherwise facilitating access with respect to information in Internet Protocol (IP) version 6 (IPv6) over Low Power Wireless Personal Area Network (6LoWPAN) format in a network.

BACKGROUND

6LoWPAN is an acronym of "Internet Protocol (IP) version 6 (IPv6) over Low Power Wireless Personal Area Networks" that defines a technology standardized in IEEE 802.15.4 where IPv6 packets may be sent and received in a network involving low-power radio devices. Such devices are typically constrained with respect to memory/processing resources, power consumption, and radio transmission range. Integration of a network of 6LoWPAN-compliant low-power devices, which may be usually deployed in indoor applications, with an external IP network, be it IPv4 or IPv6, remains a challenge and continues to present a significant obstacle to implementing advanced IPv6-based services, especially in Internet of Things (IoT) or Internet of Everything (IoE) architectures.

SUMMARY

The present patent application discloses systems, methods, devices, apparatuses and associated computer-readable media having executable program instructions thereon for providing or otherwise facilitating 6LoWPAN data access in a number of implementations. In one aspect, an embodiment of a method operating at a Radio Unit (RU) element of an access system is disclosed for facilitating access with respect to information in 6LoWPAN format. The claimed embodiment comprises receiving 6LoWPAN data ("6LO data") packets from a router coupled to an external packet-switched network; examining a destination IP address of the 6LO data packets and determining an address of at least one radio dot (RD) element to which the 6LO data packets are to be delivered; repackaging the 6LO data packets as a control channel message in a format specified for a control channel associated with a communication link using Ethernet cabling (e.g., CAT 5/6/7 cabling; hereinafter referred to as an Ethernet cable link or Ethernet cable communication link) between the RU element and the at least one RD element; and transmitting the repackaged 6LO data packets to the at least one RD element via the Ethernet cabling communication link as the control channel message.

In another embodiment, a system is disclosed for providing access with respect to information in 6LoWPAN format. The claimed embodiment comprises a Digital Unit (DU) element having baseband functionality that is configured to interface with a cellular radio communications network adapted for mobile telephony and data (for example, including but not limited to 2G/3G/4G/5G or Next Generation networks; hereinafter referred to as a cellular radio communications network); an RU element coupled to the DU element using a first connection and to at least one RD element using a second connection, the RU element having an interface for receiving 6LO data packets from a router coupled to an external packet-switched network; a bridging function module included in the RU element and configured to: examine a destination IP address of the 6LO data packets and determine an address of the at least one RD element to which the 6LO data packets are to be delivered; and repackage the 6LO data packets as a control channel message in a format specified for a control channel associated with the second connection. A transceiver module is included in the RU element for transmitting the repackaged 6LO data packets to the at least one RD element via the second connection as the control channel message.

In another embodiment, a non-transitory computer-readable medium is disclosed containing instructions stored thereon which, when executed by a processor of an RU element, facilitate access with respect to information in 6LoWPAN. The claimed embodiment comprises a code portion for processing 6LO data packets received from a router coupled to an external packet-switched network; a code portion for examining a destination IP address of the 6LO data packets and for determining an address of at least one RD element to which the 6LO data packets are to be delivered, wherein the at least one RD element is coupled to the RU unit via an Ethernet cable communication link (i.e., a communication link using Ethernet CAT 5/6/7 cabling); a code portion for repackaging the 6LO data packets as a control channel message in a format specified for a control channel associated with the Ethernet cable communication link between the RU and the at least one RD elements; and a code portion for facilitating transmission of the repackaged 6LO data packets to the at least one RD element via the Ethernet communication link as the control channel message.

In another aspect, an embodiment of a method operating at a DU (i.e., Baseband Unit or BBU) element of a wireless access system is disclosed for providing access with respect to information in 6LoWPAN format. The claimed embodiment comprises receiving 6LO data packets from a router coupled to an external packet-switched network; examining a destination IP address of the 6LO data packets and determining an address of at least one RD element to which the 6LO data packets are to be delivered; based on the address of the at least one RD element, determining an address of a corresponding RU element associated with the at least one RD element; repackaging the 6LO data packets in a format specified for a control/management (C/M) channel associated with a communication link disposed between the DU and RU elements and operable with Common Public Radio Interface (CPRI) protocol; and transmitting the repackaged 6LO data packets to the RU element as a CPRI C/M message via the communication link operable with the CPRI protocol, wherein the CPRI C/M message includes the address of the at least one RD element.

In a still further embodiment, a method operating at an RU element of an access system is disclosed for facilitating access with respect to information in 6LoWPAN format. The claimed embodiment comprises receiving 6LO data packets from a DU element coupled to an external packet-switched network, wherein the 6LO data packets are packaged in a C/M channel message associated with a communication link operable with the CPRI protocol; unpacking the C/M message and obtaining a destination address of an RD element to which the 6LO data packets are to be delivered; repackaging the 6LO data packets as a control channel message in a format specified for a control channel associated with an Ethernet cable communication link between the RU and RD elements; and transmitting the repackaged 6LO data packets to the RD element via the Ethernet cable communication link as the control channel message.

In a still further embodiment, a system is disclosed for providing access with respect to 6LoWPAN information. The claimed embodiment comprises a DU element having baseband functionality that is configured to interface with a cellular radio communications network, the DU element including an interface for receiving 6LO data packets from a router coupled to an external packet-switched network; a bridging function module included in the DU element and configured to: examine a destination IP address of the 6LO data packets and determine an address of at least one RD element to which the 6LO data packets are to be delivered; determine, based on the address of the RD element, an address of an RU element corresponding to the at least one RD element; and repackage the 6LO data packets in a format specified for a C/M channel associated with a communication link disposed between the DU element and the corresponding RU element and operable with the CPRI protocol. The DU element further includes a transceiver module for transmitting the repackaged 6LO data packets to the corresponding RU element as a CPRI C/M message via the communication link operable with the CPRI protocol, wherein the CPRI C/M message includes the address of the at least one RD element.

In a still further embodiment, a non-transitory computer-readable medium is disclosed containing instructions stored thereon which, when executed by a processor of a DU element, facilitate access with respect to 6LoWPAN information. The claimed embodiment comprises a code portion for processing 6LoWPAN data packets received from a router coupled to an external packet-switched network; a code portion for examining a destination IP address of the 6LO data packets and for determining an address of at least one RD element to which the 6LO data packets are to be delivered; a code portion, responsive to determining the address of the at least one RD element, for determining an address of a corresponding RU element associated with the at least one RD element; a code portion for repackaging the 6LO data packets in a format specified for a C/M channel associated with a communication link disposed between the DU element and the corresponding RU element and operable with the CPRI protocol; and a code portion for facilitating transmission of the repackaged 6LO data packets to the corresponding RU element as a CPRI C/M message via the communication link operable with the CPRI protocol, wherein CPRI C/M message includes the address of the at least one RD element.

In yet another aspect, an active antenna element (AAE) or radio dot (RD) embodiment operable in a 6LoWPAN access system is disclosed. The claimed embodiment comprises a cable front-end (FE) block or module for interfacing with an Ethernet cable communication link connecting to an RU element disposed in the access system; a radio FE block or module coupled to the cable FE block and an antenna operative to receive and transmit radio signals for effectuating wireless communications with respect to one or more user equipment (UE) devices; a sensor element or component configured to generate sensor data with respect to a measurement variable; a processor coupled to the sensor component and a modem interfacing with the cable FE block, the processor configured to facilitate packaging of the sensor data as 6LoWPAN data packets; and a control channel repackager operative under control of the processor for repackaging the 6LO data packets to be transmitted via the modem as a control channel message in a format specified for a control channel associated with the Ethernet cable communication link between the RU and RD elements.

Another RD embodiment is disclosed that includes a cable front-end (FE) element for interfacing with an Ethernet cable communication link connecting to a Radio Unit (RU) element disposed in the access system; a radio FE block coupled to the cable FE block and an antenna operative to receive and transmit radio signals for effectuating wireless communications with respect to one or more UE devices; a sensor element configured to generate sensor data with respect to an environmental variable as 6LoWPAN data packets; a processor coupled to the sensor component and a modem interfacing with the cable FE block; and a control channel repackager operative under control of the processor for repackaging the 6LO data packets to be transmitted via the modem as a control channel message in a format specified for a control channel associated with the Ethernet cable communication link between the RU and RD elements.

Yet another RD embodiment is disclosed that includes a cable front-end (FE) element for interfacing with an Ethernet cable communication link connecting to an RU element disposed in the access system; a radio FE block coupled to the cable FE block and an antenna operative to receive and transmit radio signals for effectuating wireless communications with respect to one or more UE devices; an access point (AP) element configured to facilitate transmission and reception of 6LoWPAN data packets wirelessly with respect to one or more 6LoWPAN-compliant devices; a processor coupled to the AP element and a modem interfacing with the cable FE block; and a control channel repackager operative under control of the processor for repackaging the 6LO data packets received via the AP element to be transmitted via the modem as a control channel message in a format specified for a control channel associated with the Ethernet cable communication link between the RU and RD elements.

In a still further embodiment, a method operating at an RD element is disclosed for facilitating access with respect to 6LoWPAN information. The claimed embodiment comprises obtaining source data; determining if the source data is compliant with the 6LoWPAN format; and if so, repackaging the 6LoWPAN-compliant source data to be transmitted as a control channel message in a format specified for a control channel associated with an Ethernet cabling link between the RD and a corresponding RU element coupled thereto and disposed in the access system.

In a still further embodiment, a non-transitory computer-readable medium is disclosed containing instructions stored thereon which, when executed by a processor of an RD element configured to operate in an access system, facilitate providing access with respect to 6LoWPAN information. The claimed embodiment comprises a code portion for processing source data; a code portion for determining if the source data is compliant with the 6LoWPAN format; and a code portion, responsive to determining that the source data is compliant with the 6LoWPAN format, for repackaging the 6LoWPAN-compliant source data to be transmitted as a control channel message in a format specified for a control channel associated with an Ethernet cable link between the RD and a corresponding RU element coupled thereto and disposed in the access system.

In a still further aspect, an embodiment of a method operating in a Pico-Radio Remote Unit (PRRU)-based access system (PRAS) is disclosed for providing access with respect to 6LoWPAN information. The claimed embodiment comprises receiving, at a Baseband Unit (BBU) element (which may be somewhat equivalent to an embodiment of a DU element described hereinabove), 6LoWPAN data packets from a router coupled to an external packet-switched network; examining a destination IP address of the 6LO data packets and determining an address of at least one pico remote radio unit (PRRU) element to which the 6LO data packets are to be delivered; based on the address of the at least one PRRU element, determining an address of a remote radio hub (RHUB) element corresponding to the at least one PRRU element; repackaging the 6LO data packets in a format specified for a C/M channel associated with a first communication link disposed between the BBU and RHUB elements and operable with the CPRI protocol; transmitting the repackaged 6LO data packets to the RHUB element in a first CPRI C/M message via the first communication link operable with CPRI protocol, the CPRI C/M message including the address of the PRRU element; unpacking, at the RHUB element, the first CPRI C/M message received from the BBU element and obtaining the at least one PRRU element's address to which the 6LO data packets are to be delivered; and repackaging the 6LO data packets in a second CPRI C/M message and transmitting the second CPRI C/M message to the at least one PRRU element via a second communication link operable with the CPRI protocol. It should be appreciated that in a PRAS architecture, the BBU may be equivalently implemented as a DU element in other embodiments described above.

In another embodiment, a system is disclosed for providing access with respect to 6LoWPAN information in a PRRU network. The claimed embodiment comprises a BBU element having baseband functionality that is configured to interface with a cellular radio communications network, the BBU element including an interface for receiving 6LoW-PAN data packets from a router coupled to an external packet-switched network; a bridging function module included in the BBU element and configured to: examine a destination IP address of the 6LO data packets and determine an address of at least one PRRU element to which the 6LO data packets are to be delivered; determine, based on the address of the PRRU element, an address of an RHUB element corresponding to the at least one PRRU element; and repackage the 6LO data packets in a format specified for a C/M channel associated with a first communication link disposed between the BBU element and the corresponding RHUB element and operable with the CPRI protocol. The BBU element further includes transceiver module for transmitting the repackaged 6LO data packets to the corresponding RHUB element as a first CPRI C/M message multiplexed with other CPRI data (e.g., ID data flows) via the first communication link, the first CPRI C/M message including the address of the at least one PRRU element. The RHUB element is configured to unpack the first CPRI C/M message received from the BBU element and obtain the at least one PRRU element's address to which the 6LO data packets are to be delivered; and repackage the 6LO data packets in a second CPRI C/M message and transmit the second CPRI C/M message to the at least one PRRU element via a second communication link operable with the CPRI protocol.

In a still further embodiment, a non-transitory computer-readable medium is disclosed containing instructions stored thereon which, when executed by a processor of a BBU element, facilitate access with respect to 6LoWPAN information. The claimed embodiment comprises a code portion for processing 6LoWPAN data packets received from a router coupled to an external packet-switched network; a code portion for examining a destination IP address of the 6LO data packets and for determining an address of at least one PRRU element to which the 6LO data packets are to be delivered; a code portion, responsive to determining the address of the at least one PRRU element, for determining an address of a corresponding RHUB element associated with the at least one PRRU element; a code portion for repackaging the 6LO data packets in a format specified for a C/M channel associated with a first communication link disposed between the BBU element and the corresponding RHUB element and operable with the CPRI protocol; and a code portion for facilitating transmission of the repackaged 6LO data packets to the corresponding RHUB element as a CPRI C/M message via the first communication link operable with the CPRI protocol, wherein the CPRI C/M message includes the address of the at least one PRRU element.

In still further embodiments, a gateway/router is disclosed that may be coupled to a DU element or an RU element of a wireless access system (e.g., a radio dot system or RDS) embodiment described above. Being a bordering node between an external IP network and the RDS, the gateway/router may be referred to as an RGR node. In one variation, the RGR node comprises, inter alia, a transceiver module for coupling to an Internet Protocol (IP) version 6 (IPv6) network; and a transceiver module for coupling to a DU element disposed in an indoor wireless access network (e.g., RDS) configured to transport information in 6LoWPAN format, wherein the DU element is interfaced with a cellular core network and coupled to a plurality of RU elements via a set of respective first connections. Each RU element is, in turn, coupled to a corresponding plurality of 6LoWPAN endpoints via a set of respective second connections. An adaptation layer module configured to support fragmentation and reassembly operations for information between IPv6 format and 6LoWPAN format is included in the RGR node. A Point-to-Point (P2P) connection database operatively coupled to the adaptation layer module maintains data identifying a plurality of P2P connections with respect to the plurality of 6LoWPAN endpoints, wherein a P2P connection is defined by an address combination including at least an address of the DU element, an address of a particular RU element and an address of a particular 6LoWPAN endpoint coupled to the particular RU element. One or more processors of the RGR node are coupled to a memory and configured to control the adaptation layer module and facilitate downlink (DL) transmission of IPv6 information received from the IPv6 network to a 6LoWPAN endpoint via the DU element and a corresponding RU element and uplink (UL) transmission of 6LoWPAN information received from a 6LoWPAN endpoint via a corresponding RU element and the DU element to a next hop in the IPv6 network responsive to corresponding P2P connections identified in the P2P connection database. In a related variation, the RGR node may be coupled to an RU element of the RDS network, wherein the IP bridging functionality resides. The overall functionality of such an RGR node is similar to the RGR node coupled to a DU element as described above, mutatis mutandis.

In still further aspects, additional embodiments of non-transitory computer-readable media containing instructions stored thereon are disclosed for performing one or more embodiments of the methods set forth hereinbelow when executed by corresponding hardware platforms.

Advantages of the present invention include, but not limited to, leveraging an indoor wireless solution for facilitating access to 6LO data in an architecture without having to deploy a separate network. As Internet of Things (IoT) or Internet of Everything (IoE) architectures continue to evolve and IPv6 backhaul infrastructure becomes more pervasive, embodiments of the present disclosure provide advantageous solutions for capitalizing on such advances, which can incentivize service providers/operators to provision new and additional IoT/IoE-based services. Further, by integrating sensor capabilities within the access network's downstream endpoints, the need for a dedicated sensor network (e.g., a capillary network) can be obviated. Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1:
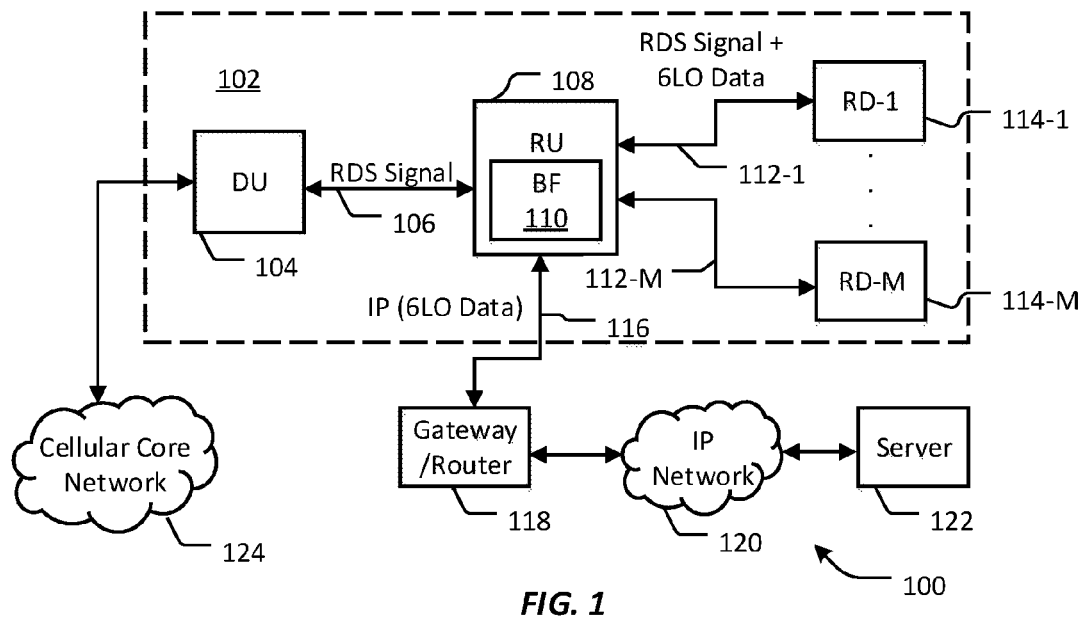
FIG. 1 depicts an example network environment including a 6LoWPAN data access system (6LODAS) according to an embodiment of the present patent application.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node (e.g., a router, switch, bridge, etc.) is a piece of networking equipment, including hardware and software that communicatively interconnects other equipment on a network (e.g., other network elements, end stations, etc.). Some network elements in certain embodiments may comprise "multiple services network elements" that provide support for multiple networking functions (e.g., routing, bridging, switching, Layer-2 aggregation, session border control, Quality of Service, and/or subscriber management, and the like), and/or provide support for multiple application services (e.g., data, voice, and video). For purposes of the present patent application, a network element may be deployed in enterprise networks, intranets, extranets, Internet service provider networks, border networks, etc. Additionally or alternatively, a network element may also comprise in some embodiments a node or functionality deployed in indoor wireless personal access networks (WPANs), home area networks (HANs), wireless sensory networks, etc., wherein indoor wireless access solutions (e.g., indoor mobile broadband) may be implemented with respect to various user equipment (UE) devices such as, e.g., smartphones, tablets, laptops, and the like, in addition to providing access to any Internet Protocol (IP) addressable devices, appliances and sensors involving machine-to-machine (M2M) communications.

One or more embodiments of the present patent disclosure may be implemented using different combinations of software, firmware, and/or hardware. Thus, one or more of the techniques and blocks shown in the Figures (e.g., flowcharts) may be implemented using code and data stored and executed on one or more electronic devices or nodes (e.g., a subscriber/user equipment (UE) device, an end station or endpoint, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such elements or nodes may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or data transmission. The coupling of the set of processors and other components may be typically through one or more buses and bridges (also termed as bus controllers), arranged in any known (e.g., symmetric/shared multiprocessing) or heretofore unknown architectures configured to interoperate with any Operating System (OS). Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example network environment 100 including a radio access system 102 for providing access with respect to information in 6LoWPAN format according to an embodiment of the present patent application. For purposes of the present patent application, the access system 102 may be configured to provide access relative to any number of IP addressable devices that conform to the IEEE 802.15.4 specification and may be distributed within an indoor space (e.g., a multi-level office building). As part of a PAN, such devices may communicate among themselves (e.g., M2M communications), in addition being able to communicate with a higher-level network, e.g., an external packet-switched network such as the Internet. As will be described in detail hereinbelow, the access system 102 may be adapted to transport 6LoWPAN data packets (hereinafter referred to as "6LO data") to and from one or more servers 122 coupled to an external packet-switched network, e.g., IP network 120, and may therefore be referred to as a 6LoWPAN data access system (6LODAS). Further, in the example embodiment shown in FIG. 1, the access system 102 may also provide wireless communications access relative to a cellular core network for mobile telephony and data, generally referred to as a core network 124, the signals for which may be provided to elements known as active antenna elements (AAEs) that may also operate as 6LO data generators and/or collectors. In certain implementations, the AAE elements may also be referred to as "radio head" elements. In one particular embodiment, such an arrangement may be implemented as a "radio dot" system (RDS) wherein the AAEs may be referred to as radio dots (RDs) or radio dot (RD) elements for purposes of the present patent application.

In terms of an example generalized RDS architecture, the access system 102 may be deployed as a cost-effective radio system, especially for indoor applications, by using a Digital Unit (DU) element 104 having baseband functionality that is interfaced with the cellular core network 124 and coupled to one or more Radio Unit (RU) elements, e.g., RU 108, in a star topology. Each RU element may in turn be coupled to one or more AAEs or RD elements, e.g., RD-1 114-1 to RD-M 114-M, each of which may be provided with one or more appropriate antenna elements, as will be described in detail hereinbelow. Accordingly, from DU element 104 to RD elements 114-1 to 114-M, the access system 102 may span a "multi-level star" topology that may be adapted to permit daisy-chaining of the intermediary RU elements. It should be appreciated that such an arrangement allows dynamic baseband resource distribution among RDs in order to support a flexible cell coverage architecture. It should further be noted that the DU element may also be referred to as a Baseband Unit (BBU) in the relevant art.

For connectivity and signal transmission, each RD element may be coupled to its corresponding RU element via a structured cabling system, e.g., dedicated copper (Cu) cabling such as twisted pair cables or other metallic cabling, for instance, that has suitable crosstalk and system noise properties. In one implementation, such cabling may comprise standardized Category 5 or 6 or 7 cables (CAT 5/6/7 cables), and may be configured to transmit information as radio signals in a low frequency or intermediate frequency (IF) band to reduce the cable loss. Accordingly, in one embodiment, RU to RD links 112-1 to 112-M shown in FIG. 1 may be referred to as Ethernet cabling communication links or connections, or communication links in general. Further, power to RD elements may also be provided via the cabling system (e.g., power over Ethernet or PoE), in addition supporting data transfer. Each RD element includes appropriate signal processing functionality for converting between high frequency RF (radio frequency) signals and low frequency IF (intermediate frequency) signals in order to reduce the cable loss. In downlink (DL) operation, the IF signal is received from the copper cable and up-converted to the RF signal at a desired RF band, and then the RF signal is broadcast from the antenna to one or more UE devices (not shown in FIG. 1) that may be disposed in wireless communication with the RD element. As set forth previously, such wireless communication may pertain to cellular telephony and data communications with respect to the cellular telephony network 124, and may therefore comprise bearer data (e.g., voice, data, video, etc.) as well as associated control plane signaling. In uplink operation (UL), the RF signals from the UEs are received at the RD element via the antenna and down-converted to the low frequency IF signal. The IF signal is then transmitted through the copper cable to the corresponding RU element, e.g., RU 108, to which the RD element is coupled.

Whereas the RU and RD elements are coupled in Ethernet-based structured cabling system, each RU element (e.g., RU 108) is in turn coupled to the DU element 104 via a communication link 106 that is operable with Common Public Radio Interface (CPRI) protocol. With respect to the cellular telephony/data communications, RU 108 is operative to convert between the IF signals received from RD elements 114-1 to 114-M and the baseband data flows (i.e., IQ data flows) that are compliant with the CPRI protocol. Essentially, the cellular telephony/data information in the IF signals is converted to baseband in-phase, quadrature (IQ) streams that represent time domain samples of the baseband radio signals (i.e., cellular communications radio bits), which are multiplexed along with other channels (e.g., Control/Management channel and Sync channel) and sent via the communication link 106 to DU 104. The baseband functionality of DU 104 is operative to demodulate the received IQ data flows (for uplink operation) to data and forward the data to the cellular core network infrastructure 124. In downlink operation, the baseband functionality of DU 104 is operative to modulate the data received from the cellular core network infrastructure 124 to a baseband signal and convert it to a CPRI signal, i.e., multiplex the radio bits as IQ data flows in a user plane of the CPRI protocol along with the other channels, and transmit the CPRI signal to the corresponding RU element 108. Accordingly, for purposes of at least some embodiments of the present patent application, the communication link 106 disposed between DU and RU elements 104, 108 may be referred to as a first communication link or connection whereas a communication link between the RU and RD elements may be referred to as a second communication link or connection. Furthermore, at least in some embodiments, the first communication link 106 may be implemented as an electrical transmission link (when DU and RU elements 104, 108 are relatively closely located) or as an optical transmission link (for longer ranges). Additionally, an RU element (e.g., RU 108) may also be referred to as an Indoor RU (IRU) when deployed as part of an indoor wireless solution. In a still further variation, the DU and RU elements 104, 108 may be co-located or otherwise integrated as a single unit located in a cabinet of the premises.

Irrespective of a specific implementation, the signals between the DU and RD elements of the access system 102 may be generally referred to as "RDS signals" that are transported according to the protocols and/or processes set forth above. In addition to carrying the data, the processes for effectuating end-to-end RDS communications also support appropriate control and/or management channels for facilitating functionalities such as RD configuration, control, monitoring, etc. In accordance with teachings of the present patent application, the control channels corresponding to the first and/or second communication links (i.e., links between the DU and RU elements and links between the RU and RD elements, respectively), may be advantageously adapted to transport 6LO data to and from the RD elements 114-1 to 114-M. As set forth above, the first communication link 106 may be effectuated using the CPRI protocol that provides a user plane data channel for transporting information as IQ data flows, which may be multiplexed in digital form (i.e., in bits) with control/management (C/M) messages that are packaged using a High Level Data Link Control (HDLC) link layer mechanism. The built-in C/M channel accordingly provides suitable control signaling functionality between the DU element 104 and each RU element (e.g., RU 108) coupled thereto.

With respect to the second communication links, i.e., links 112-1 to 112-M, using Ethernet cabling and respectively disposed between RU 108 and RD-1 114-1 to RD-M 114-M, the links include a dedicated control channel that may be provided at a frequency band separate from the signal band or bands (i.e., out-of-band or sideband control signaling). A suitable modem (e.g., frequency-shift keying or FSK modem) may be provided at each end of the link (at RU 108 and each RD 114-1 to 114-M, respectively) for transporting and extracting appropriate control and management messaging information between the RU and RD elements.

For purposes of the present patent application, either the DU element 104 or an RU element (e.g., RU 108) may be provided with suitable IP bridging functionality for interfacing with the external IP network via an RDS gateway/router (RGR) as will be described in detail hereinbelow. In respect of the embodiment shown in FIG. 1, the bridging functionality is provided as part of RU 108, which is interfaced with gateway/router 118 via an IP link 116 for transporting 6LO data, i.e., data in accordance with the mechanisms set forth at https://datatracker.ietf.org/wg/6lo/charter/). Accordingly, a bridging function (BF) module or block 110 is illustratively included in RU 108 that effectuates 6LO data transport via second communication links 112-1 to 112-M with respect to the RD elements 114-1 to 114-M. Second communication links 112-1 to 112-M are therefore adapted to carry both RDS signals and 6LO data. An alternative embodiment where the bridging functionality is provided as part of a DU element is exemplified in FIG. 2. First, an overview of the embodiment shown in FIG. 2 will be set forth, followed by a description of an example frequency band plan that may be used in the embodiments of FIGS. 1 and 2. Thereafter, a broad outline of the respective bridging functionalities will be set forth, with examples of specific implementations following subsequently.

Figure 2:
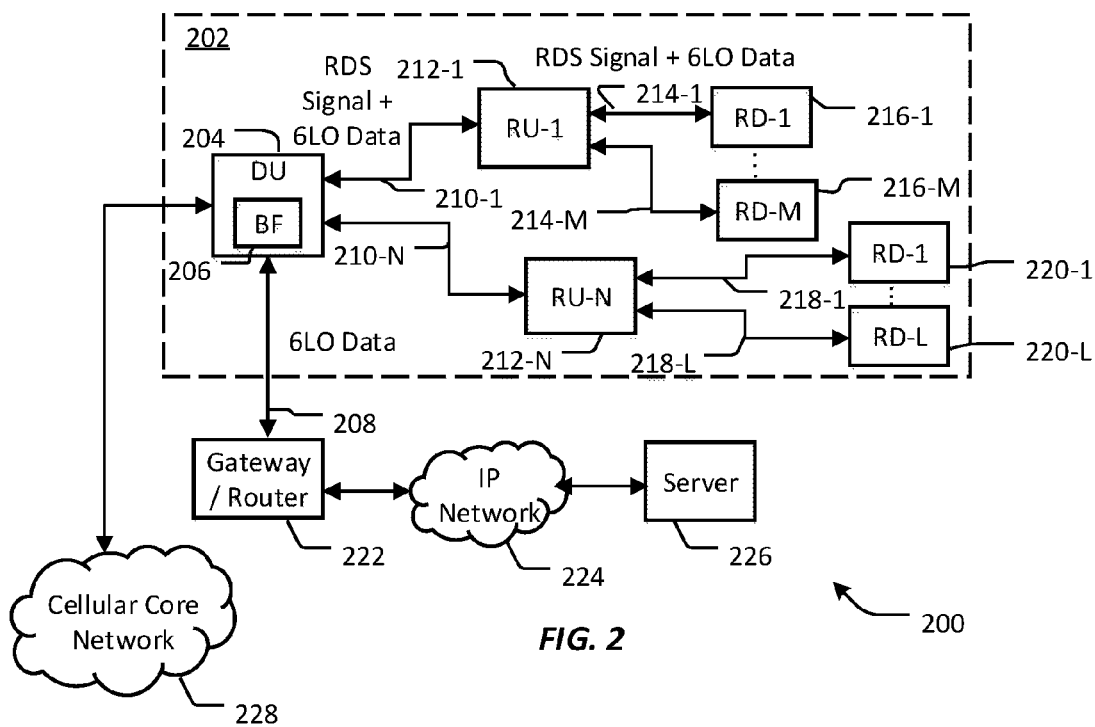
FIG. 2 depicts an example network environment including a 6LODAS according to another embodiment of the present patent application.

Turning to FIG. 2, an example network environment 200 including an RDS-based access system 202 exemplifies incorporation of a bridging function (BF) module 206 within a DU element 204 for purposes of transporting 6LO data according to another embodiment of the present patent application. Those skilled in the art will recognize that the access system 202 is illustrative of a more generalized implementation of an RDS system having a multi-level star topology wherein a single DU element, e.g., DU 206, is operatively coupled to a plurality of RU elements, e.g., RU-1 212-1 to RU-N 212-N, via respective first communication links or connections 210-1 to 210-N, each of the RU elements, in turn, being coupled to respective sets of RD elements using corresponding sets of second communication links or connections. As illustrated, RU-1 212-1 is operative to support a first plurality of RD elements, RD-1 216-1 to RD-M 216-M, that are coupled to RU-1 212-1 via communication links 214-1 to 214-M, respectively. Likewise, RU-N 212-N is operative to support Nth plurality of RD elements RD-1 220-1 to RD-L 220-L that are coupled thereto via communication links 218-1 to 218-L. Similar to the embodiment shown in FIG. 1, DU 204 is interfaced to a cellular core network 228 for effectuating wireless communications with respect to one or more RD elements of the access system 202, wherein such wireless communications may comprise any known or heretofore unknown cellular technologies, including, e.g., 3rd Generation Partnership Project (3GPP)-compliant communications technologies as explained elsewhere in the present patent application.

As the IP bridging functionality is provided as part of DU 204, a gateway/router 222 is coupled thereto for interfacing with an external packet-switched network 224, e.g., a public IP network such as the Internet, for accessing one or more servers 226 with respect to 6LO data. Because of the IP bridging at the head-end, i.e., DU 204, of the access system 202, both first and second communication links are adapted to carry RDS signals and 6LO data. Further, similar to the embodiment shown in FIG. 1, first communication links 210-1 to 210-N disposed between the DU and RU elements in FIG. 2 may be implemented using the CPRI protocol and may therefore be referred to as CPRI links. Likewise, second communication links 214-1 to 214-M and 218-1 to 218-L disposed between the RU elements and respective sets of RD elements may be implemented using the Ethernet cables, which may be referred to as Ethernet cable communication links or Ethernet cable links. It should therefore be appreciated that the baseband functionalities of the DU and RU elements shown in FIG. 2 are substantially similar to the functionalities of the DU and RU elements described hereinabove with respect to FIG. 1 and the description of the various functional/structural features set forth in the two Figures may be applied relative to each other, mutatis mutandis.

Figure 3:
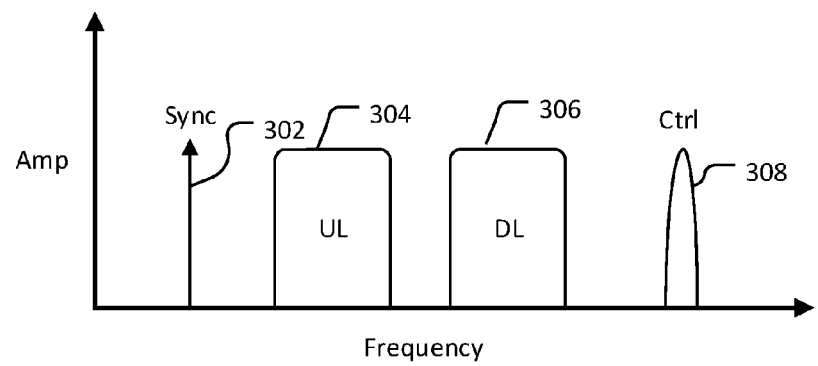
FIG. 3 depicts an example frequency band plan for use with an embodiment of a 6LODAS of the present patent application.

FIG. 3 depicts an example frequency band plan 300 for use with an embodiment of a 6LODAS of the present patent application such as, e.g., the embodiments shown in FIGS. 1 and/or 2 set forth above, for effectuating communications on an Ethernet cable link disposed between RU and RD elements. As alluded to previously, the Ethernet cable based communication links are adapted to carry signals in an intermediate frequency (IF) band to reduce cable loss (e.g., a frequency range of less than 200 MHz or thereabouts, with a bandwidth of 40-80 MHz). A Sync signal 302 is provided effectuating frequency/phase synchronization, etc., followed by a frequency band for uplink communications (i.e., from RD elements to RU elements), referred to as UL band 304. Another frequency band, DL band 306, is provided for downlink communications (i.e., from RU elements to RD elements), which is the followed by a control signal band 308 for effectuating control/management messages. In the example embodiment of FIG. 1 where the IP bridging is done in RU 108, the control signal band 308 may be appropriately modulated for carrying 6LO data to and from the RD elements 114-1 to 114-M. Further, the Ethernet cable communication links in embodiments of either FIG. 1 or FIG. 2, or both, may also support remote powering of the RD elements, i.e., power over Ethernet or PoE, in certain implementations, which provides for DC power supply from the RU elements coupled thereto.

Figure 4:
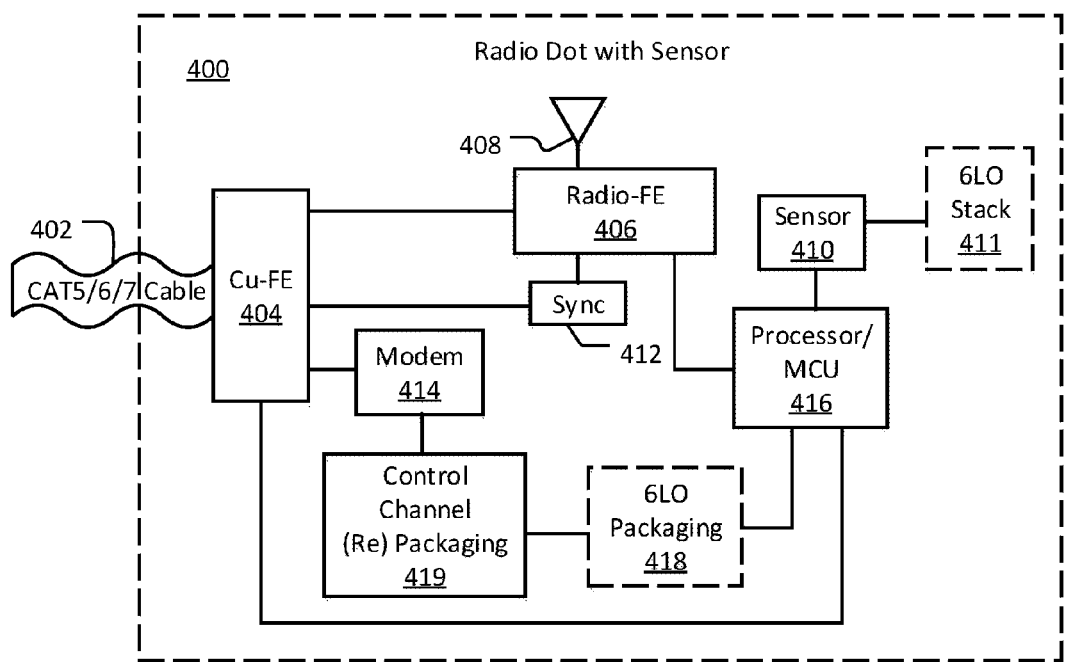
FIG. 4 depicts a block diagram of an active antenna element (AAE) or a radio dot (RD) having a sensor component according to an embodiment of the present patent application.

Taking reference to FIG. 4, depicted therein is a block diagram of an active antenna element (AAE) or a radio dot (RD) element 400 including a sensor component 410 according to an embodiment of the present patent application. In one example implementation, the sensor 410 associated with RD 400 may be configured to sense or otherwise measure one or more ambient or environmental variables such as, including but not limited to, temperature, moisture, light, motion, pressure, and the like. Sensor 410 may therefore comprise a temperature sensor, a moisture sensor, a light sensor, a pressure sensor, or a motion sensor, etc., or any combination thereof. Additionally, sensor 410 may be illustrative of various biological/physiological sensors, chemical sensors, environmental quality sensors (e.g., air/water quality), etc. Further, as part of an IoT/IoE-based architecture, the sensor element 410 may be configured to obtain or otherwise generate sensor data from any Internet-connected appliance or physical device and may comprise, without limitation, measurement/instrumentation equipment, sensing equipment, medical device/instrumentation, intelligent home/automobile device/instrumentation, smart metering instrumentation, gaming/home entertaining equipment, computing/communication equipment such as laptops, tablets, desktops, mobile communication devices, and the like, depending on the specific application environment and appropriate packaging/integration. Accordingly, the term "measurement variable" may encompass any variable(s) or a combination thereof that may be measured or otherwise sensed by the sensor component 410 for purposes herein.

As described previously, RD 400 may be provided with appropriate cabling 402 comprising one or more twisted pair cables for carrying RDS signals, including control channel messages, to and from an RU element associated therewith. A cable/copper front-end (Cu—FE) block or module 404 interfaced with the cabling 402 may be configured for multiplexing/de-multiplexing various signals of the IF frequency band (e.g., Sync signals, UL/DL signals and control channel signals). A radio front-end or FE block 406 is operative for IF/RF conversions (IF-to-RF for DL transmission and RF-to-IF for UL transmission) and may be interfaced with one or more antennas 408, depending on transceiver (Tx/Rx) circuitry and frequency filtering implementations. A Sync block 412 extracts the Sync signal transmitted from the RU side and synchronizes the RD element's clock signal with the access network/system's clock. A modem (e.g., FSK modem) 414 is operative to perform modulation and demodulation of the signals, including control channel signals, under control of a suitable processor 416 (e.g., a microcontroller or microprocessor), to and from the RU side of the access network/system, as will be described in detail below. In general, processor/controller 416 may be configured to execute appropriate program instructions for controlling the RD element 400 according to the messages received from the RU side and for effectuating 6LO data processing. Processor/MCU 416 may also execute or otherwise effectuate suitable control channel message processing or packaging 419 (e.g., according to RU-RD control channel messaging) in conjunction with modem 414. Further, depending on implementation, sensor 410 may or may not include appropriate functionality for generating sensor data that is compliant with the 6LoWPAN specification, which functionality is illustratively shown as an optional 6LO stack 411. Accordingly, RD 400 may also optionally include a 6LO data functionality, generally referred to as (re)packager 418 for packaging, repackaging, unpackaging, etc., that is executed under control of processor 416 for transmission to/from the RU side in certain variations. Additionally, it should be appreciated that RD 400 may be provided with suitable powering circuitry (not specifically shown) for effectuating remote powering (e.g., PoE implementation).

Figure 5:
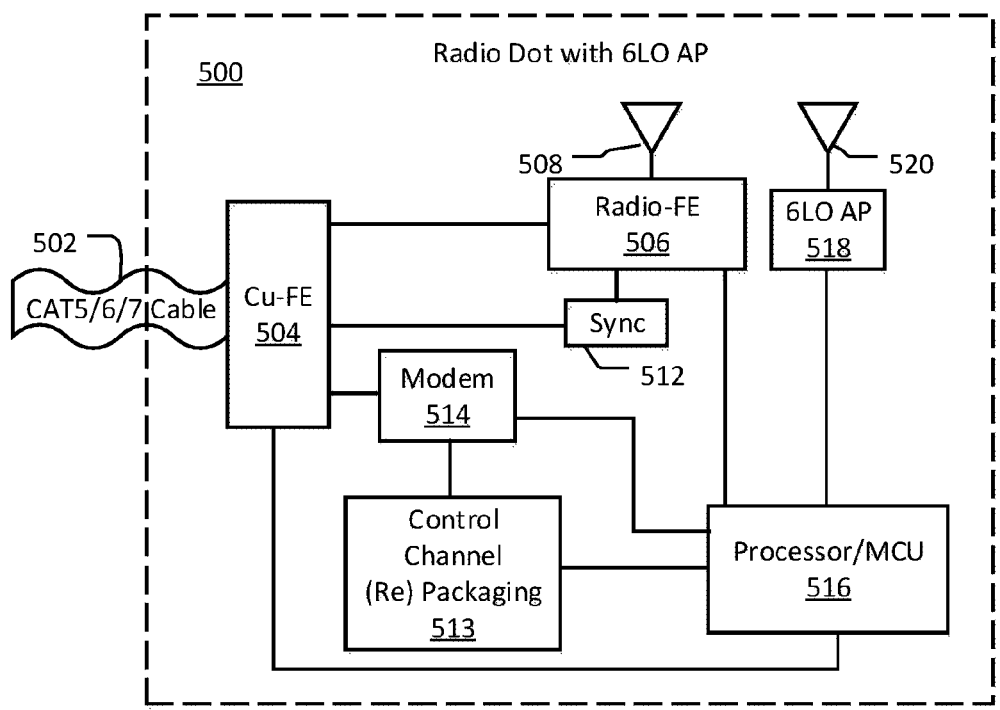
FIG. 5 depicts a block diagram of an AAE or RD having a 6LO access point (AP) according to an embodiment of the present patent application.
Figure 6:
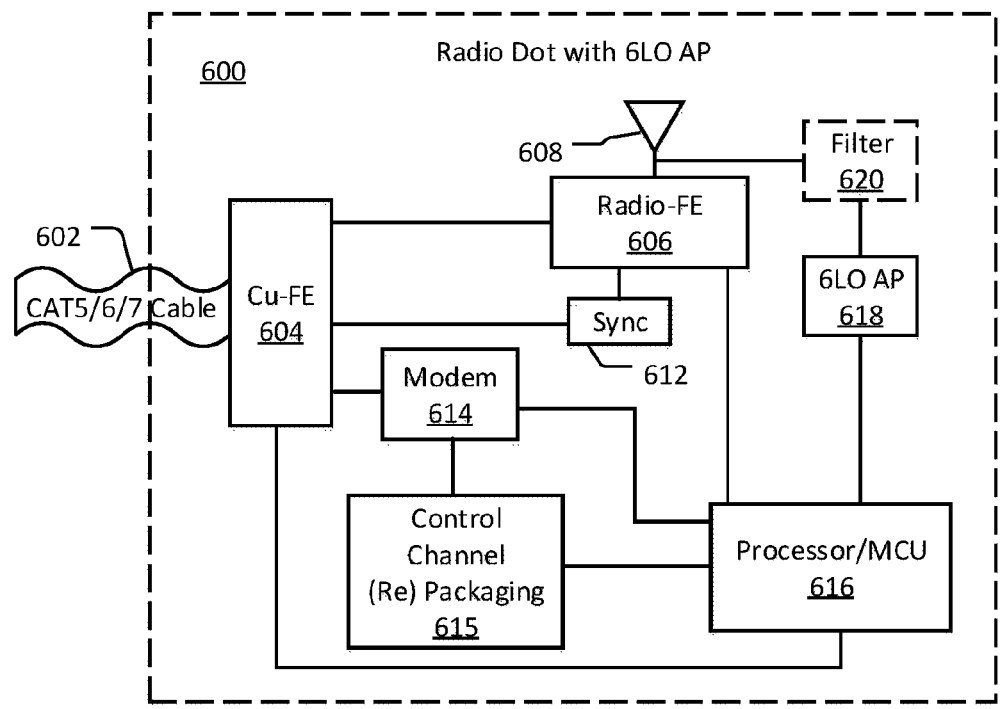
FIG. 6 depicts a block diagram of an AAE or RD having a 6LO AP according to another embodiment of the present patent application.

FIGS. 5 and 6 depict block diagrams of an AAE or RD element 500 and 600, respectively, including a 6LO access point (AP) 518 or 618 according to additional embodiments of the present patent application. In general, a 6LO AP may be implemented to provide the access to wireless sensors and/or wireless sensor gateways that collect the data from a plurality of sensors. One skilled in the art will recognize upon reference hereto that the various components and blocks of RD 500 and RD 600 are substantially similar to the components and blocks described above with respect to FIG. 4. Accordingly, the description set forth above with respect to certain features of RD 400 is equally applicable to the embodiments shown in FIGS. 5 and 6, mutatis mutandis. As a result, a separate description of features referenced by reference numerals 502-516 in FIG. 5 and reference numerals 602-616 is not set forth herein. Keeping that in mind, it should be appreciated that 6LO AP 518 of RD 500 in FIG. 5 may be provided with an antenna element 520 that is separate from the radio FE antenna 508 for communicating with other 6LO sensors, 6LO devices, and/or 6LO gateways. On the other hand, the embodiment shown in FIG. 6 employs a common or shared antenna 608 that is used by both radio FE block 606 and 6LO AP 618. A suitable filtering block 620 is therefore provided as part of RD 600 for separating the frequency bands used for the two types of wireless communications (e.g., 3GPP versus 6LoWPAN communications). For example, a 2.1 GHz antenna may be adapted for use with a 2.4 GHz 6LO signal, although the antenna efficiency may be degraded somewhat. To address such implementations and associated issues, it should be appreciated that appropriate antenna designs may be required (e.g., a wideband antenna that is adapted to support more bandwidth covering neighboring 6LO bands). Although a suitable band filter may be integrated within radio FE block 606 and/or 6LO AP block 618 for separating the frequency bands used in wireless communications via the shared antenna 608, an optional external filtering block may be provided instead as part of RD 600, e.g., filter 620 illustrated in FIG. 6.

To the extent the data associated with 6LO AP elements 518 and 618 is not 6LoWPAN compliant, processors 516, 616 in FIGS. 5 and 6, respectively, may be configured to execute a 6LO data functionality, analogous to a variation of the embodiment depicted in FIG. 4, for packaging, repackaging, unpackaging, etc., with respect to the gathered or collected source/sense data. 6LO data packets may be (re)packaged as control channel messages for transmission between the RD and RU elements via appropriate Ethernet cabling communication links as will be described below. In addition, it should be understood that the access points may be configured to effectuate a 6LO interface of any Layer 2 (L2) technology that runs the 6LO stack. Accordingly, the antenna embodiments set forth herein can be any of the IEEE 802.15.4g, IEEE 802.11n or Z-wave antenna elements, and the 6LO stack of exemplary RDS implementations may therefore be executed by a suitable L2 interface for capturing the 6LO data signals. Such 6LO example implementations may also comprise ZigBee, Z-wave and BT-le (BlueTooth low energy) implementations.

Figure 9:
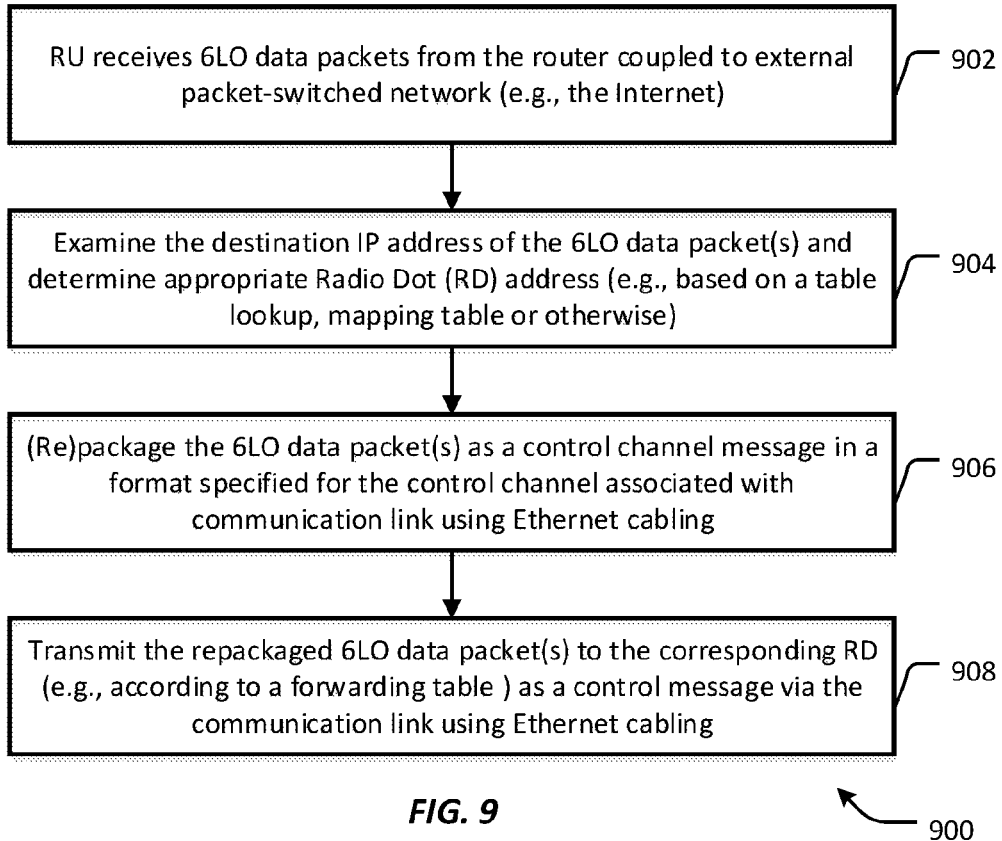
FIG. 9 depicts a flowchart of blocks relative to various steps and/or acts that may take place at an RU element for effectuating data transfer with respect to the embodiment shown in FIG. 1.

Turning now to FIG. 9, depicted therein is a flowchart of blocks relative to various steps and/or acts of a process 900 that may take place at an RU element, e.g., RU 108, for effectuating data transfer with respect to the embodiment shown in FIG. 1, wherein IP bridging is effectuated by way of the BF module 110. In the example embodiment shown in FIG. 9, a downlink process is illustrated whereby 6LO data packets received from a gateway or border router (e.g., router 118) are transmitted to a destination RD element which may comprise any of the foregoing embodiments described above (i.e., RD with a sensor, RD with a 6LO access point, with one or more antenna elements, and with or without a separate or shared antenna arrangement, or any combination thereof). When the RU element receives 6LO data packets from the gateway router coupled to the external packet-switched network, they may be processed appropriately (e.g., decapsulation, unpacking, etc.), whereupon the destination IP address of the received packets may be examined for determining the destination RD element's address, as exemplified by blocks 902 and 904. In one implementation, such determination may be effectuated by way of maintaining an IP-to-RD address mapping database (e.g., a forwarding table) and querying the database as needed. Repackaging functionality of the BF module is operative to repackage the 6LO data packets as a control channel message in a format specified for the control channel associated with the Ethernet cable communication link disposed between the RU and RD elements (block 906). Thereafter, the repackaged 6LO data packets are transmitted as an RD-RU control channel message to the appropriate RD element based on the forwarding table determination (block 908). Accordingly, the 6LO data packets may be taken as the payload of the control channel messages.

Figure 11A:
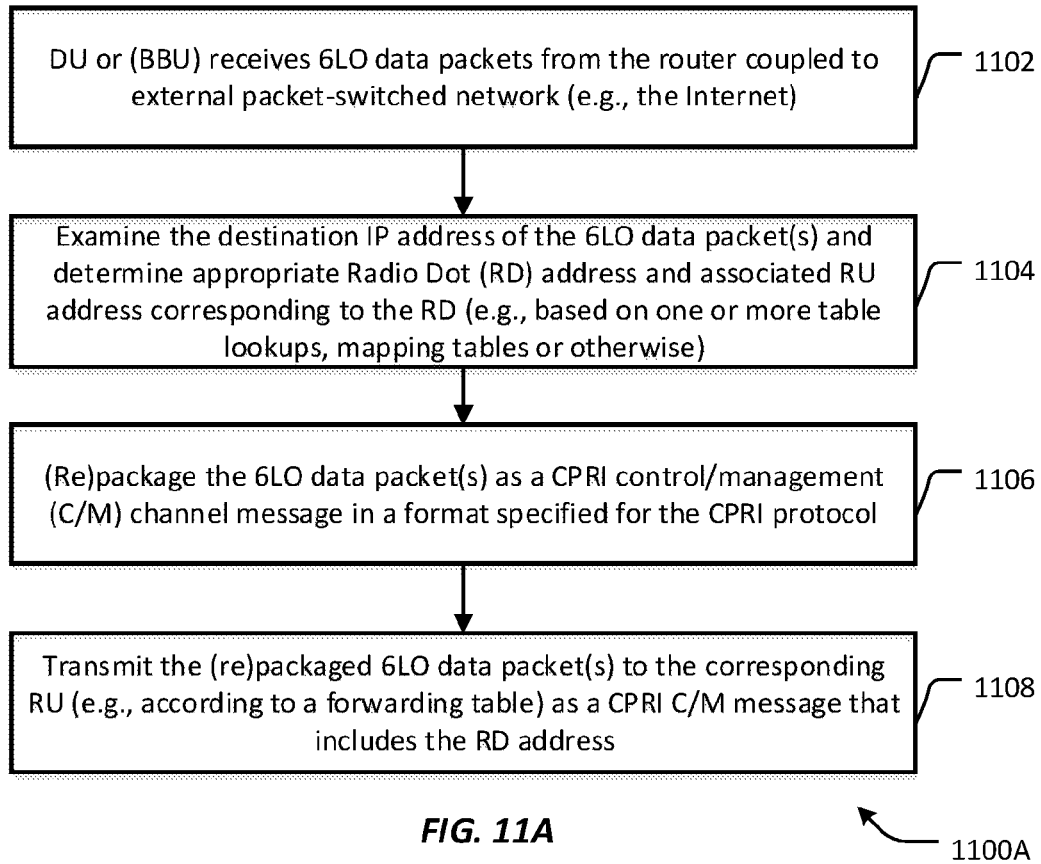
FIGS. 11A and 11B depict flowcharts of blocks relative to various steps and/or acts that may take place at DU and RU elements for effectuating data transfer with respect to the embodiment shown in FIG. 2.
Figure 11B:
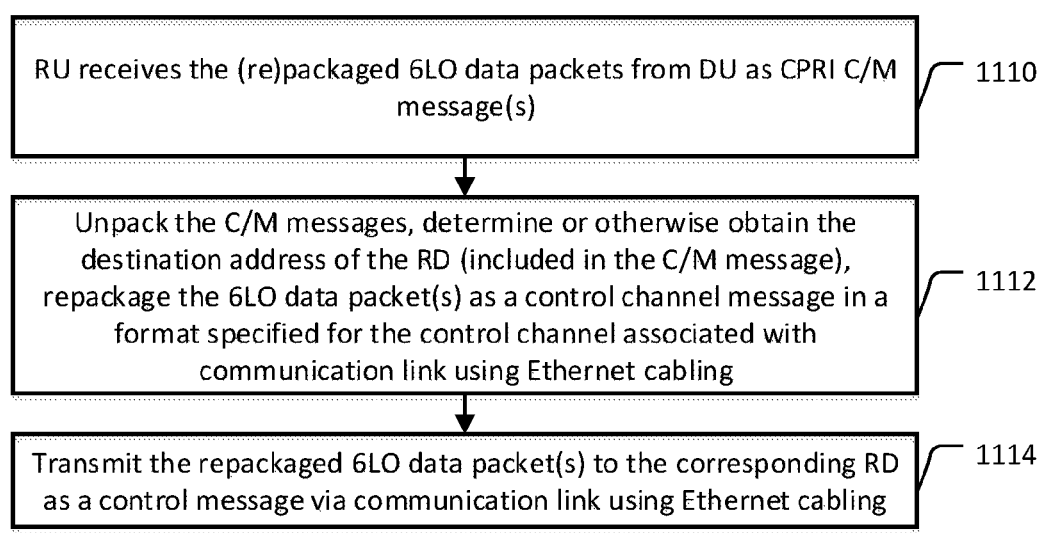

In an embodiment where the IP bridging takes place at a DU element, e.g., DU 204 in FIG. 2, a two-stage (re)packaging process may be required. FIGS. 11A and 11B depicts a flowchart of blocks relative to various steps and/or acts of such a process 1100A/1100B that may take place at DU and RU elements, respectively, for effectuating data transfer with respect to the embodiment shown in FIG. 2. When a DU or BBU element receives 6LO data packets from a gateway router coupled to the external packet-switched network, they may be processed as needed and the IP destination address field of the packets is examined in order to determine a corresponding RD element's address to which the packets are ultimately destined as well as the associated RU element's address that the packets need to traverse (blocks 1102 and 1104). In one implementation, the DU element may maintain suitable IP-to-RD and RU-to-RD address mapping databases for effectuating a two-step querying process. Alternatively, where the address mapping databases are integrated as a single IP-to-RU-to-RD database or table, querying may be effectuated accordingly to determine or otherwise obtain the next hop RU element's address. Repackaging functionality of the BF module executing at the DU element is operative to repackage the 6LO data packets as a CPRI control/management (C/M) channel message in a format specified for the CPRI protocol. Thus, the 6LO data packets may be taken as the payload of the CPRI C/M channel messages for this segment of communications. Block 1106 of FIG. 11A is illustrative of such CPRI-compliant packaging and may be referred to as the first (re)packaging stage. Thereafter, the repackaged 6LO data packets are transmitted to the corresponding RU element based on the forwarding table determination(s) as a CPRI C/M message via the CPRI communication link disposed therebetween (block 1108). In one implementation, the CPRI C/M message packaged with the 6LO data may also include the RD element's address to which the 6LO data packets are destined. It should be appreciated that in such an arrangement, the intermediary RU element may not be required to maintain a separate IP-to-RD address mapping database and, accordingly, another address mapping query may be avoided thereat. On the other hand, where the CPRI C/M messages do not include an RD element's address, a secondary address mapping query may be required by the RU element.

Reference numeral 1100B of FIG. 11B generally refers to a process at the RU element (e.g., RU-i 212$i$, i=1, 2, . . . , N) that receives CPRI C/M messages packaged with 6LO data from the DU element 204. Upon receiving the (re)packaged 6LO data packets from the DU element as CPRI C/M messages, the destination of the RD element is determined or otherwise obtained (e.g., included in the C/M message) after unpacking the C/M message, as exemplified at blocks 1110 and 1112. Thereafter, the 6LO data packets are (re)packaged as a control channel message in a format specified for the control channel associated the Ethernet communication link, which may be referred to as the second (re)packaging stage (block 1112). The RU-RD control message(s) including the (re)packaged 6LO data packets are transported to the corresponding RD element via the Ethernet cable communication link disposed therebetween (block 1114). Similar to the embodiment described hereinabove with respect to FIG. 9, a destination RD element in the embodiment of FIGS. 11A and 11B may comprise any of the RD implementations described previously.

Figure 10:
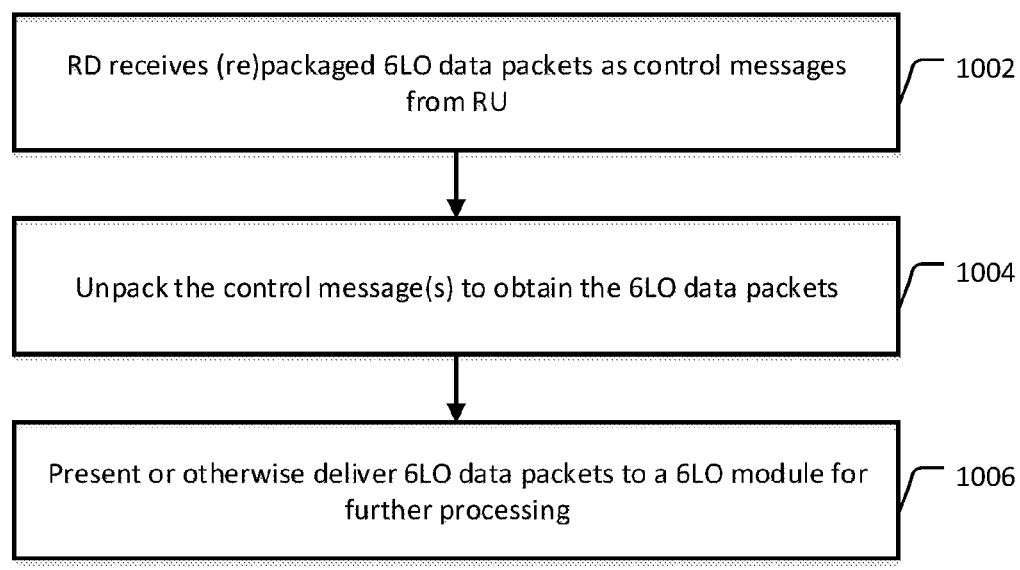
FIG. 10 depicts a flowchart of blocks relative to various steps and/or acts that may take place at an RD element with respect to receiving 6LoWPAN data from an RU element.

FIG. 10 depicts a flowchart of blocks relative to various steps and/or acts with respect to a process 1000 that may take place at an RD element upon receipt of (re)packaged 6LO data from an RU element. It should be appreciated that process 1000 is agnostic as to whether the 6LO data was bridged at RU or at DU because irrespective of where the bridging is done, the RD element receives the (re)packaged 6LO data as a control channel message relative to the RU-RD link in the embodiments of FIGS. 1 and 2. In one implementation, such a control channel associated with the RU-RD links may be proprietary. In other variations, the control channel may be compliant with respect to known standards. As an example, the frame structure for the control channel may comply with the IEEE 802.15.4g specification and the message may comply with HDLC. Regardless of whether standards-compliant or proprietary implementation, upon receiving the RU-RD control message(s) including 6LO data, the RD element is operative to unpack the control message(s) and obtain the 6LO data packets after suitable demodulation (blocks 1002 and 1004). Thereafter the 6LO data packets may be presented or otherwise delivered to a suitable 6LO module or unit for further processing, e.g., effectuating a DL transaction relative to a sensor (whether integrated within the RD element or otherwise), delivery via a 6LO access point to one or more 6LO devices associated with the RD element, and the like, as exemplified at block 1006.

One skilled in the art will recognize upon reference hereto that whereas FIGS. 9 and 11A/11B describe bridging and (re)packaging operations relative to DL transactions, the bridging functionalities of RU and DU elements are also operative to execute similar processes—but generally in reverse—for effectuating 6LO bridging with respect to UL transactions (i.e., transmission of 6LO data packets from the RD elements to RU and on to DU elements of a 6LO access system. In general, a 6LO unit in the RD is operative to (re)package the packets according to the RU-RD control channel message specification and transmit upstream to the RU element. Upon receipt, the RU element unpacks the control channel message and may forward the 6LO data to an RDS gateway/router if the RU element is where IP bridging takes place. The RU element may repackage the 6LO data according to 6LoWPAN with source IP address associated with the RD element (e.g., where RD is integrated with a sensor that does not implement a full 6LoWPAN stack). In the case where a DU element executes IP bridging, the intermediary RU element unpacks the RU-RD control channel message including the 6LO data and repackages them into CPRI-compliant C/M messages for transmission to the DU element. Upon receipt, the DU element unpacks the C/M message and forwards the 6LO data to an RDS gateway/router coupled thereto for transmission to a 6LO server. Similar to the RU element, the DU element may repackage the 6LO data according to 6LoWPAN with source IP address associated with the RD element where the source data is not 6LoWPAN-compliant (e.g., data generated/gathered by a sensor that does not implement a full 6LoWPAN stack and which data has not been processed at the RD element to be 6LoWPAN-compliant). Additional details, implementations and variations relative to the foregoing UL bridging processes will be set forth below in particular reference to FIGS. 12A-12B.

Figure 7A:
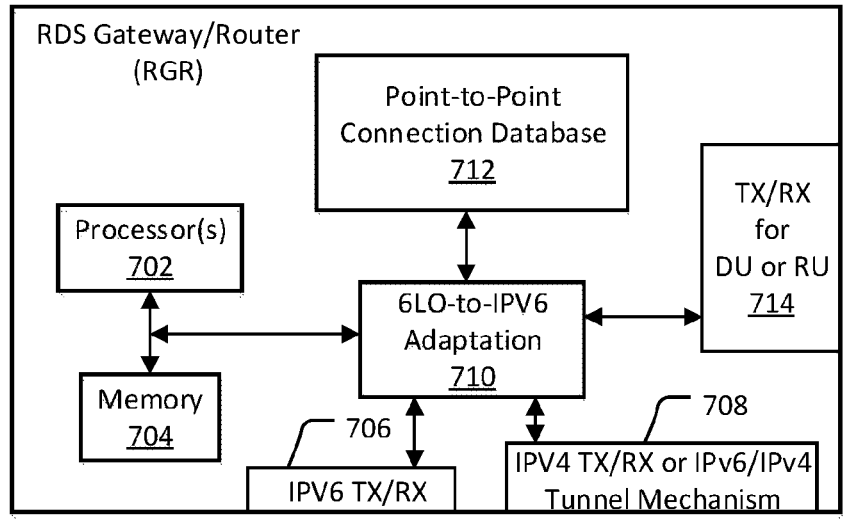
FIG. 7A depicts a block diagram of an embodiment of a gateway/border router adapted to interoperate with a Digital Unit (DU), Baseband Unit (BBU) or a Radio Unit (RU) element for purposes of the present patent application.
Figure 7B:
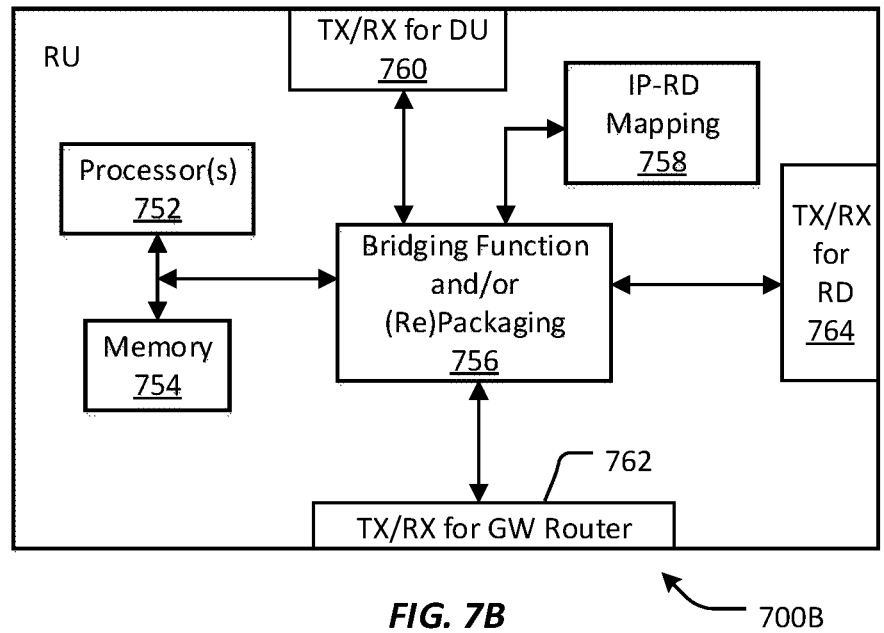
FIGS. 7B and 7C depict block diagrams of an RU element and a DU element, respectively, according to an embodiment of the present patent application.
Figure 7C:
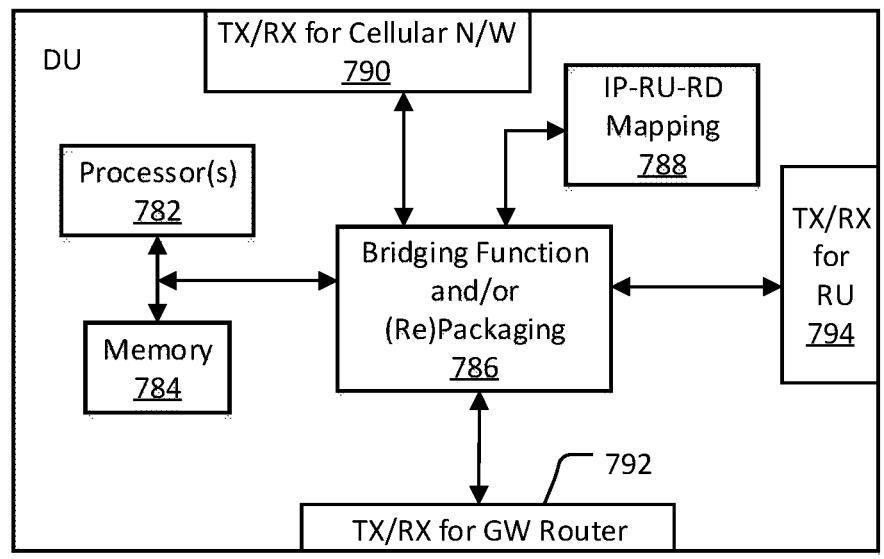

Taking reference to FIGS. 7A-7C, depicted therein are block diagrams of embodiments of an RDS gateway/router, a DU/BBU element and an RU element adapted to interoperate with each other for implementing a 6LO access system of the present disclosure. Basically, the embodiments depicted in FIGS. 7A-7C represent structural block diagrams adapted to effectuate at least some of the processes set forth in the present patent application. Reference numeral 700A of FIG. 7A generally refers to a gateway router that may be configured as a device for effectuating point-to-point (P2P) connectivity between itself and the IPv6 destination elements in respect of an example 6LO access system. One or more processors 702 coupled to suitable memory 704 (e.g., nonvolatile or persistent memory) are operable in conjunction with various other modules and/or database structures for realizing the overall functionality of the gateway router 700A. In one arrangement, IoT/IoE/M2M communications may be implemented as an end-to-end 6LoW-PAN-compliant communication system, meaning each endpoint has its own IPv6 address and 6LO media access control (MAC) address. It should be realized that the MAC address length could be of variable length/size that a 6LO technology allows for achieving compliance with the 6LoW-PAN stack. Accordingly, an example system may involve one or more of the following implementation features. For example, each access system element (DU, RU, or RD) may be provided its own IPv6 address assigned by the gateway router 700 using P2P connections. A DU or RU element may be considered as a radio end unit (REU) depending on where the IP bridging takes place. If DU implements bridging, a P2P connection may involve a path that uniquely defines a particular router-DU-RU-RD combination. Likewise, if RU implements bridging, a P2P connection may involve a path that uniquely defines a particular router-RU-RD combination. In general, therefore, a P2P connection may involve a unique router-REU-RD address combination. Also, each IoT/IoE/M2M network gateway or access point or 6LO device may be provided with a prefix (Px) and an RD element may be configured to handle devices and access points that are under the same prefix (Px). Further, an RD element may be assigned an IPv6 address based on Px and a MAC address compliant with the 6LoWPAN specification. Such addresses may be maintained in a database associated with the DU or RU elements or the router 700A (if the router is directly coupled to the RD elements without any bridging at DU/RU, in which case the router is also an REU). Packets from a IoT/IoE/M2M network gateway or access point or 6LO device are directed to the correct RD element and then mapped to the corresponding IPv6/MAC address combination in the REU which is operable to create a P2P connection to the gateway router 700A for sending suitably encapsulated data.

For purposes of the present patent application, the gateway router 700A may be configured to effectuate the following features including but not limited to: executing a routing protocol toward the IP network; advertising as a default IPv6 router toward the 6LO access system's endpoints; creating P2P connectivity for each RD element and associated REU; conversion between 6LoWPAN and IPv6 data packets as needed; maintaining a list of IPv6 and MAC addresses of the RD elements; and maintaining a dedicated interface for IPv6 and IPv4 networks; and conversion between IPv6 and IPv4 data packets as needed. Additionally, the gateway router 700A may be configured to operate as a main IP gateway between the RDS-based 6LO access system and one or more IPv6 networks. Accordingly, the gateway router 700A includes a 6LO-to-IPv6 adaptation layer 710 that defines how the IPv6 packets are carried over a constrained 6LoWPAN network implemented according to IEEE 802.15.4 specification. Because the protocol data unit (PDU) size of IEEE 802.15.4 is 127 octets whereas the maximum transfer unit (MTU) size of IPv6 packets is 1280 octets, the adaptation layer 710 provides suitable fragmentation and reassembly for IPv6 packets, while providing for a header compression scheme for reducing the size of the IPv6 header. Thus, the gateway router 700A is operative to perform the compression and decompression of IPv6 packets as well as supporting mapping between 16 bit short addresses and the IPv6 addresses for both the external IPv6 networks and a 6LoWPAN network.

A P2P connection and routing database 712 comprising the following is illustrative:

TABLE 1

| P2P Link | RU/DU IP and MAC addresses | RD/sensor IP and MAC addresses | Next Hop for Outbound hop | Destination IPv6 Px/address |
|---|---|---|---|---|
| ... | ... | ... | ... | ... |
| ... | ... | ... | ... | ... |
| ... | ... | ... | ... | ... |

In general, database 712 may include unique address mapping combinations for facilitating corresponding P2P connections with respect to an RDS. By way of an implementation, IP and MAC addresses of an RD/sensor may comprise virtual addresses because the RD may not have IP/MAC processing functionality. The system may or may not need the IP and MAC addresses of an RD/sensor for routing. That being said, functioning as the last hop router, RGR 700A needs to send the packets to the RD/sensor (or sensor's gateway) for 6LO networking purposes. It should be appreciated that RU and RD elements do not have to have IP and/or MAC addresses. RU elements may be addressable in CPRI, that is, RU addresses may comprise a port number, an RU number, etc. RD elements are connected on different Ethernet cables in an RDS; so it may be easier to address them by port numbers as well. Particularly, where each RD may be modeled as a "sector", the RD address may comprise a sector number.

By way of illustration, the gateway router 700A includes appropriate Tx/Rx circuitry and interfaces for IPv6 connectivity 706, optional IPv4 connectivity 708 as well as 6LoW-PAN connectivity 714. The gateway router 700A may also interface with an IPv4-transition or conversion block in case IPv6 data needs to be sent via an IPv4 network. Accordingly, block 708 is also illustrative of an IPv6/IPv4 tunnel mechanism. Since the gateway router 700A is capable of understanding 6LO data packets and converting the 6LoWPAN adaptation layer into a full IPv6 header, the IPv6 header's source address field contains the source address of the sending RD/sensor wherein the destination IPv6 address field is the destination IPv6 address carried in the original 6LO data. The gateway router 700A further includes the functionality for mapping the sending RD/sensor's IPv6 address with the appropriate P2P link, which is helpful when the data packets flow in the reverse direction (i.e., DL transactions).

An example RU element 700B shown in FIG. 7B is illustrative of the RU elements depicted in the embodiments of FIG. 1 or 2 described hereinabove, suitably modified as needed. One or more processors 752 coupled to suitable memory 754 (e.g., nonvolatile or persistent memory) are operable in conjunction with various other modules and/or database structures for realizing the overall functionality of RU 700B according to an embodiment of the present patent application. When implemented with IP bridging, a BF and (re)packaging module 756 may be included in RU 700B for effectuating at least some of the processes set forth hereinabove, which may be realized upon execution of program instructions or code portions under control of the processer(s) 752. As discussed previously, an IP address may be assigned with respect to each RD/sensor/6LO unit for effectuating 6LO data flow in P2P connections. Accordingly, a forwarding table or an IP association table or more generally a mapping database 758 is operable for maintaining mapping relationships between IP addresses and RD addresses (e.g., MAC addresses, RD numbers, port numbers, or sector numbers, etc.). The forwarding table 758 may be formulated as several pairs of "$IP_X$–$RD_Y$", meaning a packet having the destination IP address of $IP_X$ is to be directed to the RD having the address $RD_Y$. As described above, RD addresses may be provided in one implementation as proprietary addresses (e.g., port numbers, sector numbers or some other identifying indicia), in addition to having virtual IP/MAC addresses. Further, where the source data coming from the RD elements is not 6LoWPAN-compliant, appropriate packaging may be performed by the RU element 700B so that proper 6LO data packets (including source IP addresses associated with the RD elements) may be forwarded to a gateway router associated therewith. If RU 700B is not implemented as a bridging element, the functionality of mapping database 758 may not be necessary and instead a (re)packaging of data between CPRI C/M messages and RU-RD control messages is performed as an intermediary element between DU and RD elements. Accordingly, appropriate Tx/Rx circuitry and interfaces for (optional) gateway router connectivity 762 (if bridging is done at RU 700B), DU/CPRI connectivity 760 and RD/Ethernet cable link connectivity 764 may be provided as part of RU 700B.

An example network element 700C is shown in FIG. 7C that is illustrative of the DU (or BBU) elements depicted in the embodiments of FIG. 1 or 2 described hereinabove, suitably modified as needed depending on whether or not IP bridging takes place thereat. Further, network element 700c may also be illustrative of a BBU element in a PRAS implementation described hereinbelow. One or more processors 782 coupled to suitable memory 784 (e.g., nonvolatile or persistent memory) are operable in conjunction with various other modules and/or database structures for realizing the overall functionality of DU 700C according to an embodiment of the present patent application. When implemented with IP bridging, a BF and (re)packaging module 786 may be included in DU 700C for effectuating at least some of the processes set forth hereinabove, which may be realized upon execution of program instructions or code portions under control of the processor(s) 782. Because DU 700C is IP-based, the 6LO data of a 6LO access system can use the radio backhaul and core network to get connected with the appropriate 6LO server. Similar to the functionality of an RU element, the functionality of DU 700C may include assignment of IP addresses with respect to the RD/sensor/6LO units of the 6LO access system for effectuating 6LO data flow via P2P connections. One or more forwarding tables or IP association tables or more generally a mapping database 788 may be configured for maintaining mapping relationships between IP addresses, RD addresses (e.g., MAC addresses, RD numbers, port numbers, or sector numbers, etc.) and RU addresses. The forwarding table 788 may be formulated as several pairs of "$IP_X$-$RU_Y$-$RD_Z$", meaning a packet having the destination IP address of $IP_X$ is to be directed to the RD having the address $RD_Z$ via an intermediary RU having the address $RU_Y$. Further, where the source data coming from the RD elements is not 6LoWPAN-compliant, appropriate packaging may be performed by the DU element 700C so that proper 6LO data packets including RD elements' source IP addresses may be forwarded to a gateway router associated therewith. Additionally, the (re)packaging functionality of DU 700C is operative to (re)package 6LO data as CPRI C/M messages for DL transmission to one or more RU elements coupled thereto as described previously. Accordingly, appropriate Tx/Rx circuitry and interfaces for (optional) gateway router connectivity 792 (if bridging is done at DU 700C), RU/CPRI connectivity 794 and cellular core network connectivity 790 may be provided as part of DU 700C.

Figure 8:
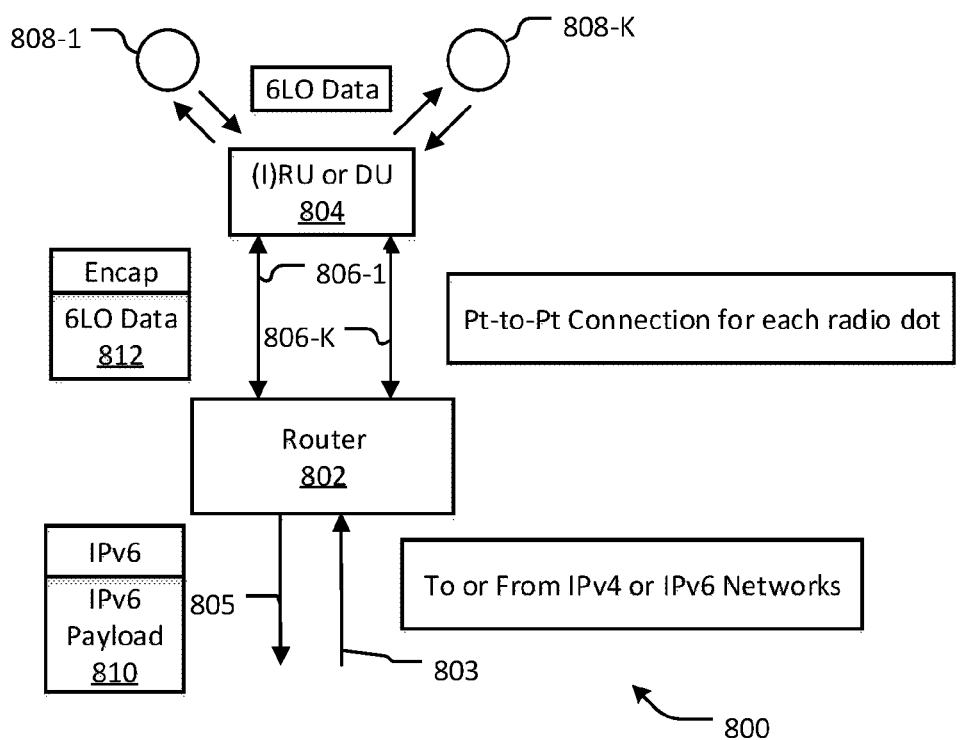
FIG. 8 depicts an example process flow illustrating data transfer between a 6LODAS endpoint and associated gateway router using point-to-point connectivity and encapsulation according to an embodiment.

FIG. 8 depicts an example process flow 800 illustrating data transfer between a 6LODAS element and associated router using point-to-point connectivity and encapsulation according to an embodiment. Reference numerals 808-1 to 808-K refer to a plurality of 6LODAS endpoint elements (e.g., RDs, RDs integrated with sensors, RDs integrated with 6LO access points, etc.) that generate or receive 6LO data via P2P connections 806-1 to 806-K maintained between a gateway router 802 and across an REU 804 (i.e., either an (I)RU or a DU element). A DL transmission 803 from an IP network (IPv6 or IPv4) and an UL transmission 805 to the IP network (IPv6 or IPv4) with respect to IPv6 payload 810 are illustrated relative to the gateway router 802 which facilitates suitable encapsulation/decapsulation of 6LO data 812 with appropriate address headers for transport via the P2P connections. In an example UL transaction (from the RD/sensor endpoint to the network), the REU element 804 decapsulates the packets, packages the data into 6LoWPAN format (if not already in that format) and forwards the 6LO data or encapsulates/maps the data to IPv6 format depending on its function/configuration. The forwarding/adjacency tables of the gateway router 802 are operative to determine the next hop into the IP network for subsequent transmission.

Figure 12A:
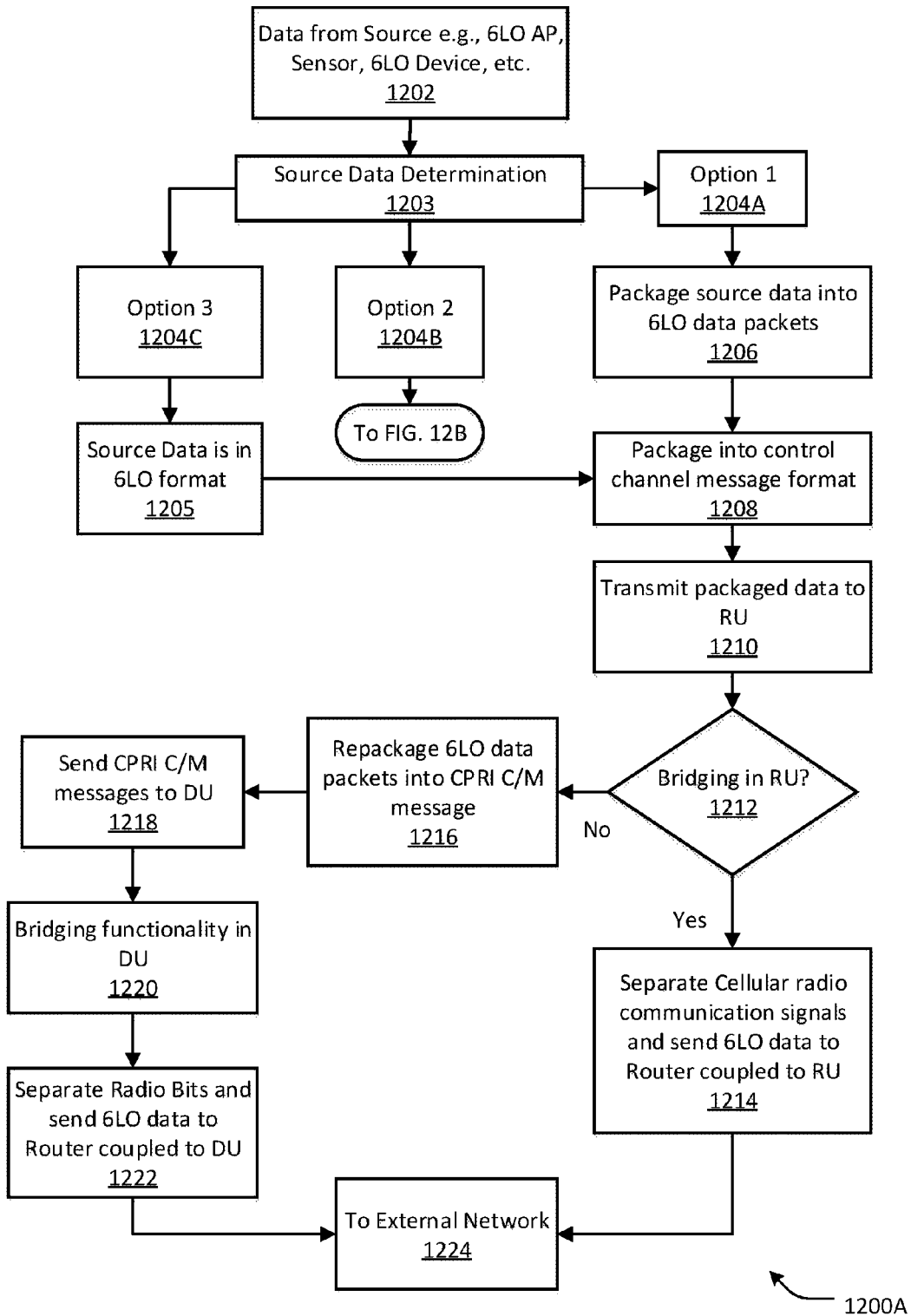
FIGS. 12A and 12B depicts flowchart of blocks relative to various steps and/or acts that may take place for effectuating data transfer with respect to one or more embodiments of the present patent application.
Figure 12B:
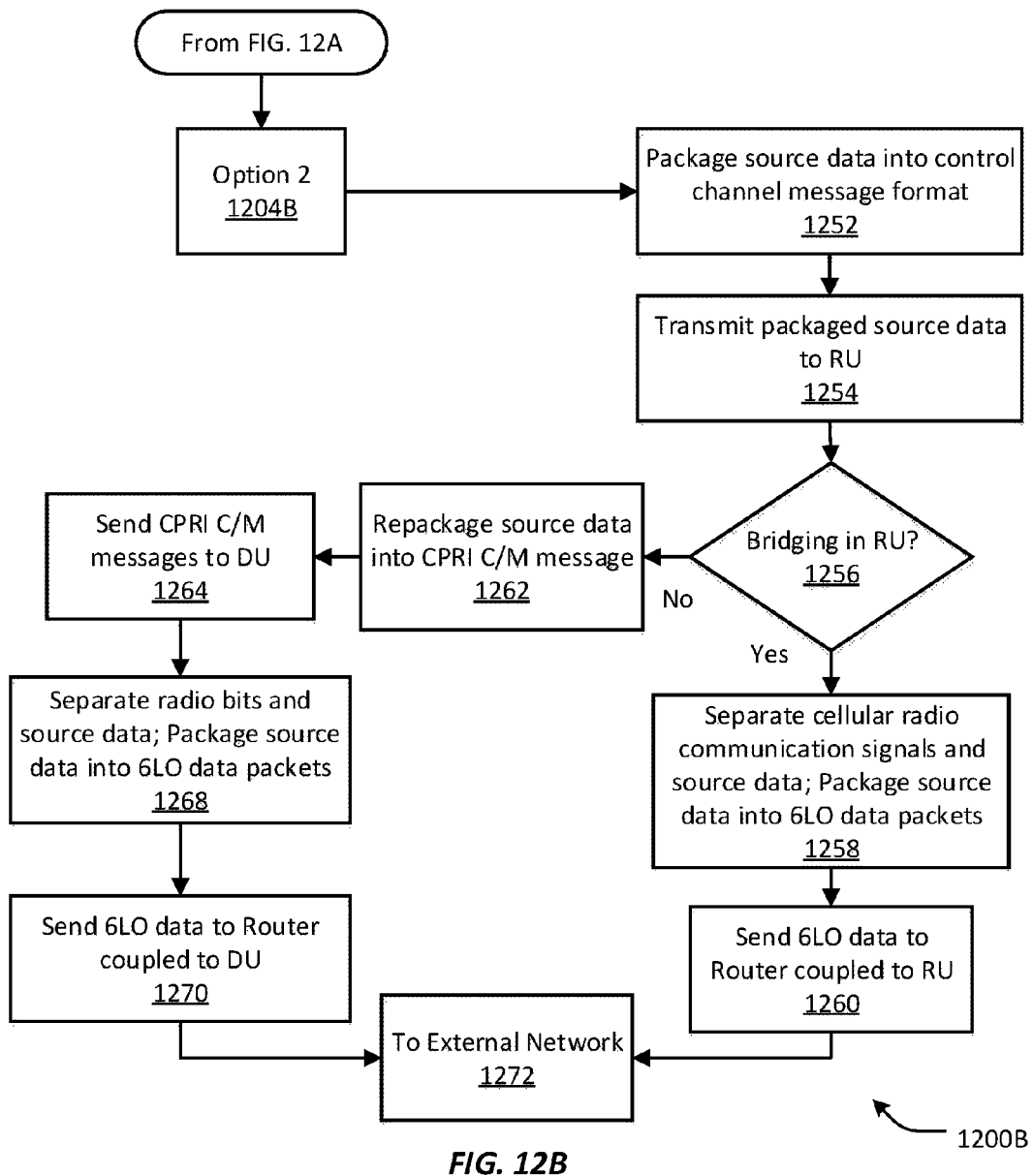

FIGS. 12A and 12B depict flowcharts of blocks relative to additional details with respect to various steps and/or acts that may take place within a 6LO access network system for effectuating 6LO data UL transactions according to one or more embodiments of the present patent application. Source data generated, measured, or otherwise obtained at an endpoint (e.g., RD/sensor, 6LO access point, 6LO device, a WiFi access point running a 6LO stack, etc., which may be processed or pre-processed as may be needed in certain implementations, exemplified at block 1202) may or may not be 6LoWPAN compliant and depending on where IP bridging takes place within the 6LO access network, a number of variations may be provided for transmission of the source data across the access network. Further, because the source data is repackaged as RU-RD control messages (regardless of whether 6LoWPAN compliant), and depending on where the 6LoWPAN compliance is achieved, additional variations may be provided. For purposes of the present patent application, the various permutations and/or combinations of potential source data treatment processes may be broadly grouped as three options, wherein not all treatment processes or steps will be necessary for practicing a specific embodiment. For example, a determination may be made at the endpoint (e.g., RD) to verify if the source data is 6LoWPAN compliant (block 1203). Process flows relating to Options 1 and 3 shown generally at 1200A in FIG. 12A are based on either achieving 6LoWPAN compliance within the RD element or upon the determination that the source data is already 6LoWPAN compliant. Process flows relating to Option 2 are shown generally at 1200B in FIG. 12B and are based on achieving 6LoWPAN compliance either at DU or at RU depending on where IP bridging takes place.

With respect to Option 1 (block 1204A), as the source data is determined to be non-compliant, it is (re)packaged as 6LoWPAN-compliant data packets at the RD element (block 1206). This step is avoided in Option 3 (block 1204C) because it is determined that the source data is already compliant (blocks 1203 and 1205). Regardless of whether the source data is already compliant or (re)packaged as 6LoWPAN-compliant data, the data is (re)packaged into a control channel message format for transmission to an RU element coupled to the RD element via an Ethernet cable communication link (blocks 1208 and 1210). A determination is made whether the RU element is operative as an IP bridging element in the 6LO access system (block 1212). If so, the RU element separates the cellular radio communication signals (in analog form), if any, relative to the wireless communications (e.g., 2G/3G/4G/5G communication signals, which are converted to the CPRI signals and transmitted to the DU element) and sends the extracted 6LO data to a gateway router coupled thereto via a suitable P2P pathway as described previously (block 1214). The 6LO data packets may be reassembled via an IPv6 adaptation layer for transmission to an external IPv6 network (block 1224).

If the bridging is not done in the RU element, the 6LO data packets are (re)packaged as a CPRI C/M message and transmitted to the DU element coupled thereto via a CPRI communication link (blocks 1216 and 1218). As the DU element is operative to perform IP bridging (block 1220), any radio bits relative to the baseband wireless communications (e.g., 2G/3G/4G/5G communications involving voice, data, or both) are separated for interfacing with the core network and the extracted 6LO data packets are transmitted to a gateway router coupled thereto via a suitable P2P pathway as described previously (block 1222) for transmission to an external IPv6 network (block 1224).

With respect to Option 2 (block 1204B), the source data (which may comprise non-compliant data) is packaged into a control channel message format for transmission to an RU element coupled to the RD element via an Ethernet cable communication link (blocks 1252 and 1254). A determination is made whether the RU element is operative for IP bridging in the 6LO access system (block 1256). If so, the RU element separates the IF radio signals, if any, relative to the wireless communications (e.g., e.g., 2G/3G/4G/5G communication signals, which are converted to the CPRI signals and transmitted to the DU element), (re)packages the source data as 6LoWPAN-compliant data and sends the 6LO data to a gateway router coupled thereto via a suitable P2P pathway as described previously (blocks 1258 and 1260). As before, the 6LO data packets may be reassembled via an IPv6 adaptation layer for transmission to an external IPv6 network (block 1272).

If the RU element is not a bridging element in the 6LO access system, the source data may be (re)packaged as a CPRI C/M message and transmitted to the DU element coupled thereto via a CPRI communication link (blocks 1262 and 1264). As the DU element is operative to perform IP bridging, any IQ data flows relative to the wireless communications (e.g., 3GPP communications involving voice, data, or both) are separated for interfacing with the cellular core network and the extracted source data may be packaged as 6LO data packets, which are transmitted to a gateway router coupled thereto via a suitable P2P pathway as described previously (blocks 1268 and 1270) for transmission to an external IPv6 network (block 1272).

Figure 13:
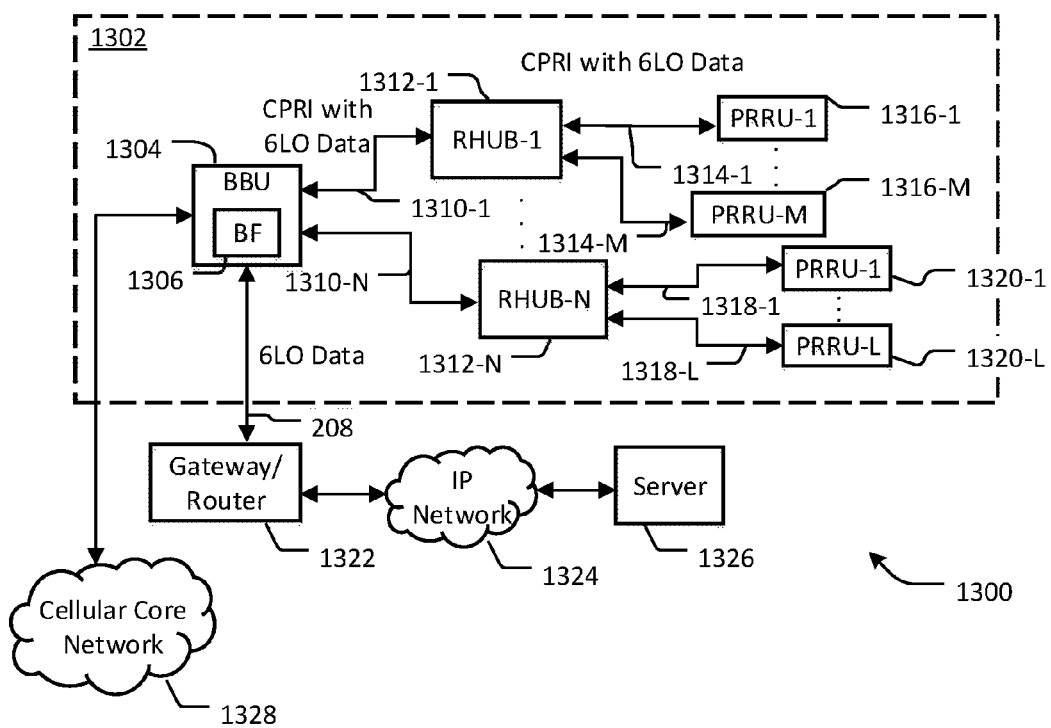
FIG. 13 depicts an example network environment including a Pico-RRU-based access system (PRAS) for accessing 6LoWPAN data according to another embodiment of the present patent application.

FIG. 13 depicts an example network environment 1300 including a Pico-RRU-based access system (PRAS) 1302 for accessing 6LoWPAN data according to another embodiment of the present patent application. A PRAS implementation may involve a plurality of small remote radio units (RRUs) (which may be referred to as pico-RRUs, usually abbreviated as pRRUs or PRRUs) that are integrated with antennas for indoor deployment, which may be configured to serve as 6LO data endpoints. Similar to the embodiment depicted in FIG. 2, a BBU element 1304 that interfaces with one or more cellular core networks 1328 is operative for effectuating IP bridging functionality (BF) 1306 for transporting 6LO data to and from a gateway router 1322 relative to one or more 6LO servers 1326 associated with an external IP network 1324. Analogous to the RU elements shown in FIG. 2, PRAS 1302 comprises a plurality of remote hub (RHUB) elements 1312-1 to 1312-N coupled to BBU 1304 via corresponding CPRI communication links 1310-1 to 1310-N. Further, each RHUB element may be configured to serve a corresponding set of PRRUs, wherein each PRRU is coupled to the RHUB element via Ethernet cabling. In contrast to the embodiment of FIG. 2, however, signal transport via the Ethernet cabling is performed in accordance with the CPRI protocol, wherein RHUB is operative to aggregate the IQ data flows from/to the PRRUs connected. Accordingly, it should be appreciated that in PRAS 1302 both BBU-RHUB and RHUB-PRRU communications are effectuated using CPRI, and the respective links may therefore be referred to as "first CPRI communication links" and "second CPRI communication links". By way of illustration, RHUB-1 1312-1 is coupled to PRRU-1 1316-1 to PRRU-M 1316-M via second CPRI communication links 1314-1 to 1314-M. Likewise, RHUB-N 1312-N is coupled to PRRU-1 1320-1 to PRRU-L 1320-L via another set of second CPRI communication links 1318-1 to 1318-L. End-to-end connections in PRAS 1302 are therefore CPRI-based, although such an implementation can be more expensive and may require higher power consumption than the embodiments previously described in respect of FIGS. 1 and 2.

6LO data may be transmitted in PRAS 1302 using CPRI C/M messages for (re)packaging the 6LO data for both UL and DL transactions from end-to-end. Keeping this distinction in mind, accordingly, the description provided for DU elements, RU elements and RD elements, including their respective variations, etc. may be equally applied to BBU elements, RHUB elements and PRRU elements of PRAS 1302, mutatis mutandis, in addition to suitably configuring the functionality of gateway router 1322 similar to that of the router embodiments described above.

Figure 14:
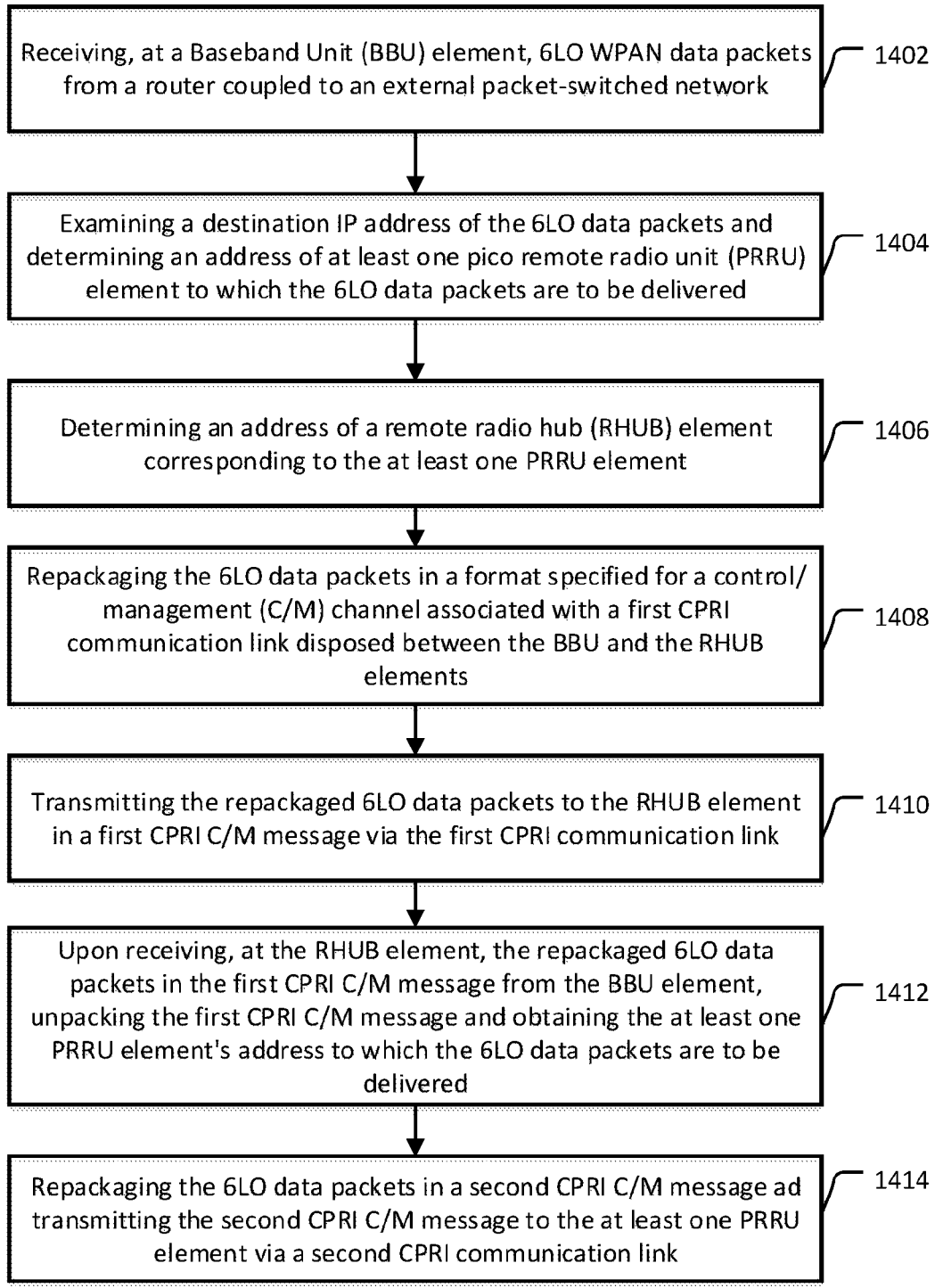
FIG. 14 depicts a flowchart of blocks relative to various steps and/or acts that may take place for effectuating data transfer with respect to the embodiment shown in FIG. 13.

Turning to FIG. 14, depicted therein is a flowchart of blocks relative to an example process 1400 that may take place for effectuating 6LO data transfer with respect to a PRAS embodiment such as one shown in FIG. 13. At block 1402, a BBU element receives 6LO data packets from a router coupled to an external packet-switched network. As set forth previously with respect to RDS-based embodiments, the data packets may be processed or pre-processed appropriately (e.g., decapsulation, unpacking, etc.), whereupon further operations may be executed. Upon examining a destination IP address of the 6LO data packets, a determination may be made regarding an address of at least one PRRU element to which the 6LO data packets are to be delivered (block 1404). Corresponding to the address of the at least one PRRU element, an address of an intermediary RHUB element may be made (block 1406). Similar to the embodiments set forth previously, appropriate database querying steps may be executed to determine the addresses (e.g., querying IP-to PPRU address mapping table(s), PPRU-to-RHUB address mapping tables(s), and/or IP-to-PRRU-to-RHUB address mapping table(s)). The BBU element (re)packages the 6LO data packets in a format specified for a control/management (C/M) channel associated with a first CPRI communication link or connection disposed between the BBU and RHUB elements, which are then transmitted to the RHUB element in a first CPRI C/M message via the first CPRI communication link (blocks 1408 and 1410). Upon receiving the repackaged 6LO data packets in the first CPRI C/M message from the BBU element, the RHUB element unpacks the first CPRI C/M message and obtains the at least one PRRU element's address to which the 6LO data packets are to be delivered (block 1412). Subsequently, the RHUB element (re)packages the 6LO data packets in a second CPRI C/M message and transmits the second CPRI C/M message to the at least one PRRU element via a second CPRI communication link or connection (block 1414).

Whereas the process flow 1400 describes a DL transaction in PRAS 1300, a similar process in reverse may be employed for effectuating UL transactions, incorporating any number of variations analogous to the RDS-based embodiments previously described, mutatis mutandis. As a result, a separate description of features relative to UL transactions in PRAS 1300 is not set forth herein.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Moreover, the acts, steps, functions, components or blocks illustrated in a particular flowchart may be inter-mixed or otherwise inter-arranged with the acts, steps, functions, components or blocks illustrated in another flowchart in order to effectuate additional variations, modifications and configurations with respect to one or more implementations for purposes of the present patent disclosure. Moreover, other blocks may be added/inserted between the blocks that are illustrated. Finally, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A radio dot (RD) element operable in an access system for providing access with respect to information in Internet Protocol (IP) version 6 (IPv6) over Low Power Wireless Personal Area Network (6LoWPAN) format, the RD element comprising:

a cable front-end (FE) block for interfacing with an Ethernet cable link connecting to a Radio Unit (RU) element disposed in the access system, the cable FE block operating to facilitate transfer of 6LoWPAN data (6LO data) signals and radio communications data signals in a frequency spectrum comprising two or more intermediate frequency (IF) bands associated with the Ethernet cable link;

a radio FE block coupled to the cable FE block and an antenna operative to receive and transmit the radio communications data signals for effectuating radio communications with respect to one or more user equipment (UE) devices;

a sensor component configured to generate sensor data with respect to a measurement variable;

a processor coupled to the sensor component and a modem interfacing with the cable FE block, the processor configured to facilitate packaging of the sensor data as 6LO data packets; and a control channel repackager operative under control of the processor for repackaging the 6LO data packets to be transmitted as upstream 6LO data signals modulated by the modem in a control signal band of the IF bands as a control channel message in a format specified for a control channel associated with the Ethernet cable link between the RU element and the RD element, wherein the control signal band is separate from uplink and downlink frequency bands of a frequency band plan comprising the two or more IF bands associated with the Ethernet cable link, the uplink and downlink frequency bands respectively for transmitting and receiving the radio communications data signals.

2. The RD element as recited in claim 1, wherein the sensor component comprises at least one or more of temperature sensors, moisture sensors, light sensors, pressure sensors, motion sensors, biological sensors, chemical sensors, and/or environmental quality sensors.

3. The RD element as recited in claim 1, wherein the cable FE block is operative to receive the radio communications data signals from the RU element relative to the radio communications in the downlink frequency band associated with the Ethernet cable link.

4. The RD element as recited in claim 1, wherein the cable FE block is operative to transmit the radio communications data signals to the RU element relative to the radio communications in the uplink frequency band associated with the Ethernet cable link.

5. The RD element as recited in claim 1, wherein the radio communications comprise at least one of 3rd Generation Partnership Project (3GPP)-compliant cellular radio communications and IEEE 802.11 communications.

6. The RD element as recited in claim 1, wherein the upstream 6LO data signals are repackaged as a Common Public Radio Interface (CPRI) control channel message by the RU element.

7. A radio dot (RD) element operable in an access system for providing access with respect to information in Internet Protocol (IP) version 6 (IPv6) over Low Power Wireless Personal Area Network (6LoWPAN) format, the RD element comprising:
   a cable front-end (FE) block for interfacing with an Ethernet cable link connecting to a Radio Unit (RU) element disposed in the access system, the cable FE block operating to facilitate transfer of 6LoWPAN data (6LO data) signals and radio communications data signals in a frequency spectrum comprising two or more intermediate frequency (IF) bands associated with the Ethernet cable link;
   a radio FE block coupled to the cable FE block and an antenna operative to receive and transmit the radio communications data signals for effectuating radio communications with respect to one or more user equipment (UE) devices;
   a sensor component including a protocol stack configured to generate sensor data with respect to a measurement variable as 6LO data packets;
   a processor coupled to the sensor component and a modem interfacing with the cable FE block; and
   a control channel repackager operative under control of the processor for repackaging the 6LO data packets to be transmitted as upstream 6LO data signals modulated by the modem in a control signal band of the IF bands as a control channel message in a format specified for a control channel associated with the Ethernet cable link between the RU element and the RD element, wherein the control signal band is separate from uplink and downlink frequency bands of a frequency band plan comprising the two or more IF bands associated with the Ethernet cable link, the uplink and downlink frequency bands respectively for transmitting and receiving the radio communications data signals.

8. The RD element as recited in claim 7, wherein the sensor component comprises at least one or more of temperature sensors, moisture sensors, light sensors, pressure sensors, motion sensors, biological sensors, chemical sensors, and/or environmental quality sensors.

9. The RD element as recited in claim 7, wherein the cable FE block is operative to receive the radio communications data signals from the RU element relative to the radio communications in the downlink frequency band associated with the Ethernet cable link.

10. The RD element as recited in claim 7, wherein the cable FE block is operative to transmit the radio communications data signals to the RU element relative to the radio communications in the uplink frequency band associated with the Ethernet cable link.

11. The RD element as recited in claim 7, wherein the radio communications comprise at least one of 3rd Generation Partnership Project (3GPP)-compliant cellular radio communications and IEEE 802.11 communications.

12. The RD element as recited in claim 7, wherein the upstream 6LO data signals are repackaged as a Common Public Radio Interface (CPRI) control channel message by the RU element.

13. A radio dot (RD) element operable in an access system for providing access with respect to information in Internet Protocol (IP) version 6 (IPv6) over Low Power Wireless Personal Area Network (6LoWPAN) format, the RD element comprising:
   a cable front-end (FE) block for interfacing with an Ethernet cable link connecting to a Radio Unit (RU) element disposed in the access system, the cable FE block operating to facilitate transfer of 6LoWPAN data (6LO data) signals and radio communications data signals in a frequency spectrum comprising two or more intermediate frequency (IF) bands associated with the Ethernet cable link;
   a radio FE block coupled to the cable FE block and an antenna operative to receive and transmit the radio communications data signals for effectuating radio communications with respect to one or more user equipment (UE) devices;
   an access point (AP) configured to facilitate transmission and reception of 6LO data packets with respect to one or more 6LoWPAN-compliant devices;
   a processor coupled to the AP and a modem interfacing with the cable FE block; and
   a control channel repackager operative under control of the processor for repackaging the 6LO data packets received via the AP to be transmitted as upstream 6LO data signals modulated by the modem in a control signal band of the IF bands as a control channel message in a format specified for a control channel associated with the Ethernet cable link between the RU element and the RD element, wherein the control signal band is separate from uplink and downlink frequency bands of a frequency band plan comprising the two or more IF bands associated with the Ethernet cable link, the uplink and downlink frequency bands respectively for transmitting and receiving the radio communications data signals.

14. The RD element as recited in claim 13, wherein the antenna of the radio FE block is shared by the AP.

15. The RD element as recited in claim 14, further comprising a filter operative to separate signals for effectuating radio communications with the UE devices from signals for effectuating the transmission and reception of 6LO data packets with respect to the 6LoWPAN-compliant devices.

16. The RD element as recited in claim 13, wherein the AP is coupled to a separate antenna operative to effectuate the transmission and reception of 6LO data packets with respect to the 6LoWPAN-compliant devices.

17. The RD element as recited in claim 13, wherein the cable FE block is operative to receive the radio communications data signals from the RU element relative to the radio communications in the downlink frequency band associated with the Ethernet cable link.

18. The RD element as recited in claim 13, wherein the cable FE block is operative to transmit the radio communications data signals to the RU element relative to the radio communications in the uplink frequency band associated with the Ethernet cable link.

19. The RD element as recited in claim 13, wherein the radio communications comprise at least one of 3rd Generation Partnership Project (3GPP)-compliant cellular radio communications and IEEE 802.11 communications.

20. The RD element as recited in claim 13, wherein the upstream 6LO data signals are repackaged as a Common Public Radio Interface (CPRI) control channel message by the RU element.

21. A method operating at a radio dot (RD) element disposed in an access system for providing access with respect to information in Internet Protocol (IP) version 6 (IPv6) over Low Power Wireless Personal Area Network (6LoWPAN) format, the method comprising:
obtaining source data;
determining if the source data is compliant with the 6LoWPAN format; and
if so, repackaging the 6LoWPAN-compliant source data to be transmitted as upstream 6LoWPAN data (6LO data) signals modulated in a control signal band of a frequency band plan associated with an Ethernet cable link between the RD element and a Radio Unit (RU) element coupled thereto and disposed in the access system and providing the upstream 6LO data signals to a cable front-end (FE) block interfacing with the Ethernet cable link, wherein the control signal band is separate from uplink and downlink frequency bands of the frequency band plan comprising two or more intermediate (IF) bands associated with the Ethernet cable link, the uplink and downlink frequency bands respectively for transmitting and receiving the radio communications data signals.

22. The method as recited in claim 21, further comprising:
upon determining that the source data is not 6LoWPAN-compliant, effectuating packaging of the non-compliant source data as 6LO data packets; and
repackaging the 6LO data packets to be transmitted as the upstream 6LO data signals modulated in the control signal band of the frequency band plan associated with the Ethernet cable link between the RD and RU elements.

23. The method as recited in claim 21, wherein the source data is obtained from a sensor component comprising at least one or more of temperature sensors, moisture sensors, light sensors, pressure sensors, motion sensors, biological sensors, chemical sensors, and/or environmental quality sensors.

24. The method as recited in claim 21, further comprising repackaging the upstream 6LO data signals as a Common Public Radio Interface (CPRI) control channel message at the RU element.

25. The method as recited in claim 21, wherein the source data is obtained via a 6LoWPAN access point (AP) configured to facilitate transmission and reception of 6LoWPAN data packets with respect to one or more 6LoWPAN-compliant devices.

26. A non-transitory computer-readable medium containing instructions stored thereon which, when executed by a processor of a radio dot (RD) element configured to operate in an access system, facilitate access with respect to information in Internet Protocol (IP) version 6 (IPv6) over Low Power Wireless Personal Area Network (6LoWPAN) format, the computer-readable medium comprising:
a code portion for obtaining and processing source data;
a code portion for determining if the source data is compliant with the 6LoWPAN format; and
a code portion, responsive to determining that the source data is compliant with the 6LoWPAN format, for repackaging the 6LoWPAN-compliant source data to be transmitted as upstream 6LoWPAN data (6LO data) signals modulated in a control signal band of a frequency band plan associated with an Ethernet cable link between the RD element and a Radio Unit (RU) element coupled thereto and disposed in the access system and providing the upstream 6LO data signals to a cable front-end (FE) block interfacing with the Ethernet cable link, wherein the control signal band is separate from uplink and downlink frequency bands of the frequency band plan comprising two or more intermediate (IF) bands associated with the Ethernet cable link, the uplink and downlink frequency bands respectively for transmitting and receiving the radio communications data signals.

27. The non-transitory computer-readable medium as recited in claim 26, further comprising:
a code portion, responsive to determining that the source data is not 6LoWPAN-compliant, for effectuating packaging of the non-compliant source data as 6LO data packets; and
a code portion for repackaging the 6LO data packets to be transmitted as the upstream 6LO data signals modulated in the control signal band of the frequency band plan associated with an Ethernet cable link between the RD and RU elements.

28. The non-transitory computer-readable medium as recited in claim 26, wherein the source data is obtained from a sensor component comprising at least one or more of temperature sensors, moisture sensors, light sensors, pressure sensors, motion sensors, biological sensors, chemical sensors, and/or environmental quality sensors.

29. The non-transitory computer-readable medium as recited in claim 26, wherein the source data is obtained via a 6LoWPAN access point (AP) configured to facilitate transmission and reception of 6LO data packets with respect to one or more 6LoWPAN-compliant devices.

30. The non-transitory computer-readable medium as recited in claim 26, further comprising instructions for repackaging the upstream 6LO data signals as a Common Public Radio Interface (CPRI) control channel message at the RU element.

* * * * *